(12) United States Patent
Noda

(10) Patent No.: US 8,065,267 B2
(45) Date of Patent: Nov. 22, 2011

(54) INFORMATION PROCESSING DEVICE, FILE DATA MERGING METHOD, FILE NAMING METHOD, AND FILE DATA OUTPUT METHOD

(76) Inventor: Masatsugu Noda, Tokyo (JP)

( * ) Notice: Subject to any disclaimer, the term of this patent is extended or adjusted under 35 U.S.C. 154(b) by 29 days.

(21) Appl. No.: 11/795,151

(22) PCT Filed: Jan. 12, 2006

(86) PCT No.: PCT/JP2006/300306
§ 371 (c)(1),
(2), (4) Date: Sep. 8, 2008

(87) PCT Pub. No.: WO2006/075667
PCT Pub. Date: Jul. 20, 2006

(65) Prior Publication Data
US 2009/0024667 A1 Jan. 22, 2009

(30) Foreign Application Priority Data
Jan. 12, 2005 (JP) .................................. 2005-005071

(51) Int. Cl.
*G06F 17/30* (2006.01)
(52) U.S. Cl. ........ 707/609; 707/673; 707/705; 707/741; 707/756; 707/758; 707/805; 707/825
(58) Field of Classification Search .................. 707/609, 707/673, 705, 741, 756, 758, 805, 825
See application file for complete search history.

(56) References Cited

U.S. PATENT DOCUMENTS

| | | | | |
|---|---|---|---|---|
| 5,603,025 A * | 2/1997 | Tabb et al. | .......................... | 707/2 |
| 5,893,130 A * | 4/1999 | Inoue et al. | .................... | 715/255 |
| 5,966,127 A | 10/1999 | Yajima | | |
| 5,970,466 A * | 10/1999 | Detjen et al. | ................. | 705/7.19 |
| 7,062,105 B2 * | 6/2006 | Funahashi | ...................... | 382/274 |
| 7,302,641 B1 | 11/2007 | Yajima | | |
| 2001/0047373 A1 * | 11/2001 | Jones et al. | ................... | 707/515 |
| 2003/0002748 A1 * | 1/2003 | Funahashi | ...................... | 382/274 |
| 2005/0076295 A1 * | 4/2005 | Simske et al. | ................ | 715/517 |
| 2006/0101347 A1 * | 5/2006 | Runov et al. | .................. | 715/764 |
| 2007/0174482 A1 | 7/2007 | Yajima | | |

FOREIGN PATENT DOCUMENTS

| | | |
|---|---|---|
| JP | 10-320492 | 12/1998 |
| JP | 11-119879 | 4/1999 |
| JP | 2004-127059 | 4/2004 |
| JP | 2005-216203 | 8/2005 |
| JP | 2005-309676 | 11/2005 |

OTHER PUBLICATIONS

Blattner et al., Special Edition Using Microsoft® Excel 2000, May 3, 2009, Que.*
Plumley, Ten Minute Guide to Windows® 95, Second Edition, Mar. 1, 1997, Que.*
International Preliminary Report on Patentability issued Jul. 26, 2007 in International (PCT) Application No. PCT/JP2006/300306.

* cited by examiner

*Primary Examiner* — Frantz Coby
(74) *Attorney, Agent, or Firm* — Wenderoth, Lind & Ponack, L.L.P.

(57) ABSTRACT

A step or means for associating a file with a cell in a table format by, for example, pasting an icon representing the file, wherein related data to be simultaneously referenced along with the data in the cell with which the file is associated is read according to a data entry positioning rule of a table format. Further, the step/means indicates merging file common condition data with record data in the file by adding the read related data to its each constituent record as the common condition value of the data file with which the corresponding cell is associated, and includes naming a file by converting a character string representing the read related data into a character string according to a prescribed rule and positioning it in a predetermined position in a template character string.

13 Claims, 31 Drawing Sheets

FIG.5

FILE MANAGEMENT TABLE

| BRANCH | 2001 | 2002 | 2003 | TOTAL (10K¥) |
|---|---|---|---|---|
| TOKYO | TOKYO-01 | TOKYO-02 | TOKYO-03 | 2563 |
| NAGOYA | NAGOYA-01 | NAGOYA-02 | NAGOYA-03 | 1748 |
| OSAKA | OSAKA-01 | OSAKA-02 | OSAKA-03 | 2132 |
| TOTAL | 2036 | 1982 | 2425 | 6443 |

FIG. 7

FILE MANAGEMENT TABLE

| YEAR | BRANCH | FILE NAME | REMARKS COLUMN |
|---|---|---|---|
| 2001 | TOKYO | TOKYO—0 1 | |
| | NAGOYA | NAGOYA—0 1 | |
| | OSAKA | OSAKA—0 1 | |
| 2002 | TOKYO | TOKYO—0 2 | |
| | NAGOYA | NAGOYA—0 2 | |
| | OSAKA | OSAKA—0 2 | |
| 2003 | TOKYO | TOKYO—0 3 | |
| | NAGOYA | NAGOYA—0 3 | |
| | OSAKA | OSAKA—0 3 | |

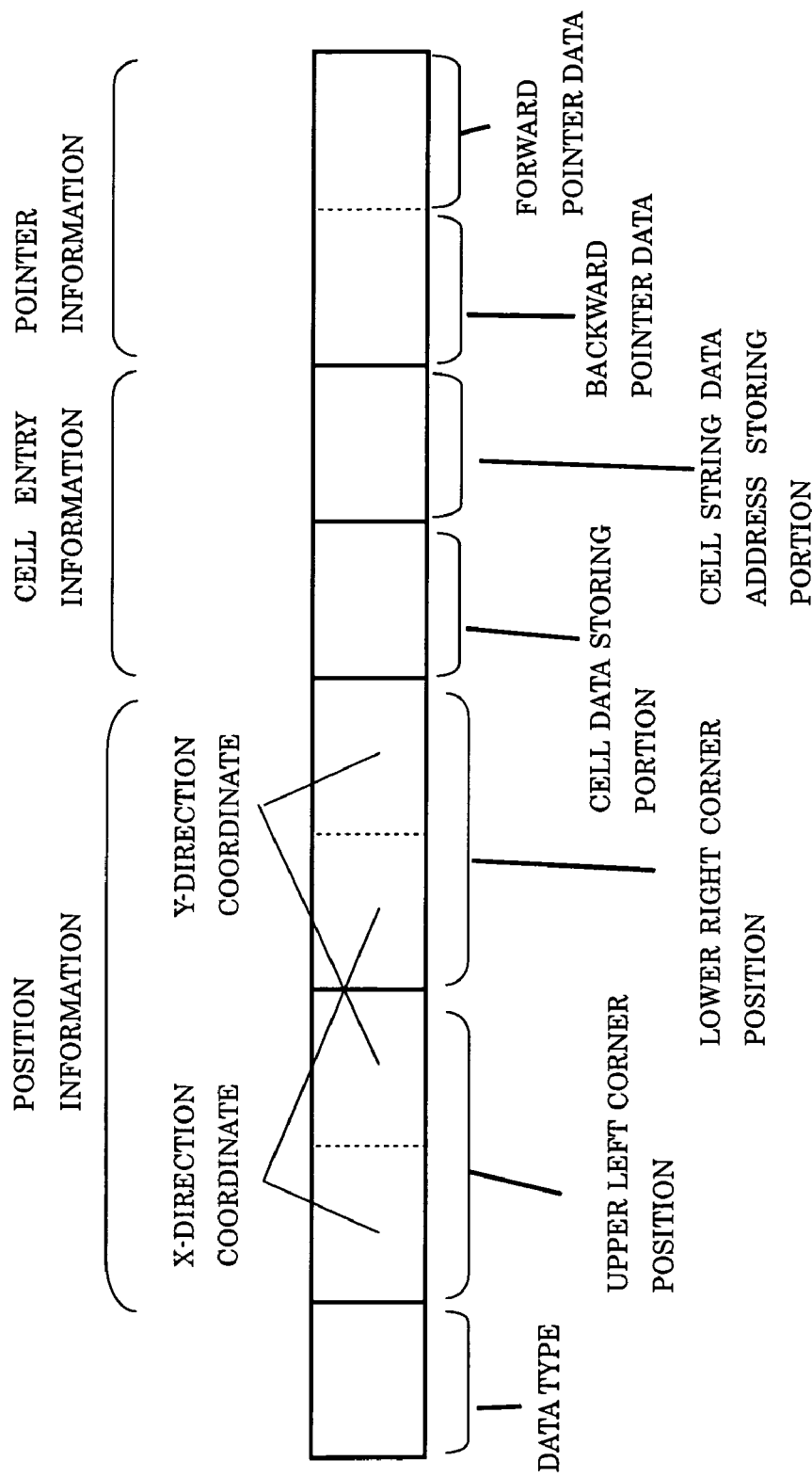
FIG. 10 CELL DATA (NORMAL CELL)

FIG. 11

[DEFINITION ELEMENT/ENTRY INFORMATION REFERENCE TABLE]

| DEFINITION SYSTEM | DEFINITION ELEMENT | CORRESPONDING DOCUMENT ELEMENT |
|---|---|---|
| COMMON | LINKING LINE | — |
| | REGISTERED WORD SPECIFICATION | ◯ ▨▨▨▨ |
| | ⋮ | ⋮ |
| FORM DEFINITION | DATA ITEM NAME | 〈　〉▨▨ |
| | FIELD DATA NAME | [　], 「▨▨ |
| | DATA ENTRY ORDER | |
| | 　ASCENDING ORDER | ↑ |
| | 　DESCENDING ORDER | ↓ |
| | SIGNIFICANT DIGITS | "NUMBER" DIGITS |
| | ROUNDING METHOD | ROUND UP, ROUNDING UP |
| | | ROUND DOWN, ROUNDING DOWN |
| | | ROUND OFF |
| | | ⋮ |
| | TABULATION NUMERIC VALUE | ◯ |
| | NON-TABULATION NUMERIC VALUE | ● |
| | KEY ITEM SPECIFICATION | △ |

FIG. 12

| CATEGORY | ITEM NAME OR NOT | USED TERM |
|---|---|---|
| FILE QUATE FIELD SPECIFICATION | ITEM NAME | FILE NAME, FILE ID, ... |
| FILE MANAGEMENT TABLE SPECIFICATION | | FILE MANAGEMENT TABLE, FILE LIST TABLE, ... |
| NUMBER ENTRY FIELD SPECIFICATION | ITEM NAME | NUMBER, NUMBER OF DATA, ... |
| RESULT ENTRY FIELD SPECIFICATION | | TOTAL, SUM, ... |

FORMAT OF APPLIED TERM DICTIONARY

FIG. 17
(a)
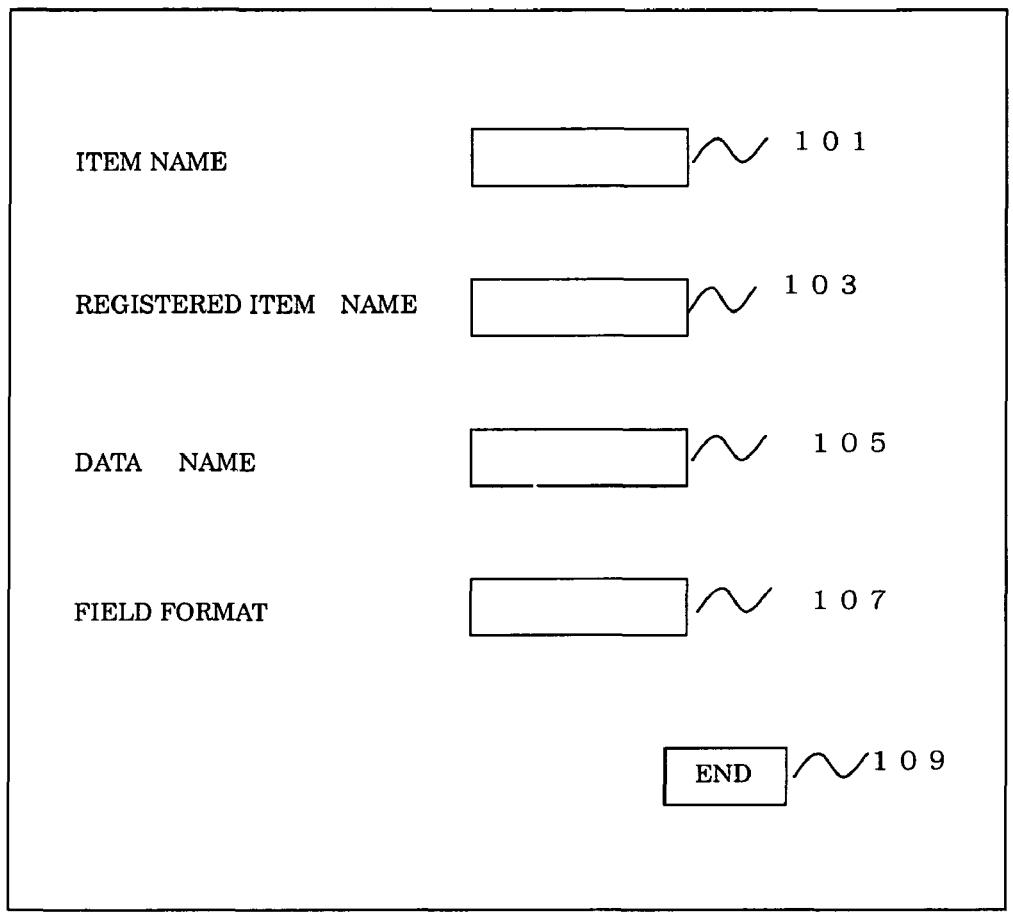
(b)
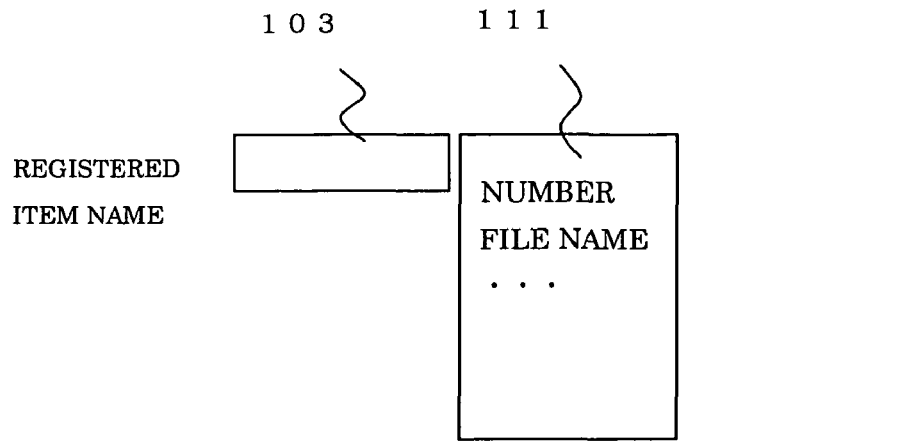

FILE MANAGEMENT TABLE

| <BRANCH> | 2001 | 2002 | 2003 | TOTAL (10K¥) |
|---|---|---|---|---|
| TOKYO | TOKYO-01 | TOKYO-02 | TOKYO-03 | 2563 |
| NAGOYA | NAGOYA-01 | NAGOYA-02 | NAGOYA-03 | 1748 |
| OSAKA | OSAKA-01 | OSAKA-02 | OSAKA-03 | 2132 |
| TOTAL | 2036 | 1982 | 2425 | 6443 |

(YEAR) (BLUE), (FILE NAME) (BLUE), 141, 142, (BLUE) annotations around table.

(b)

FILE MANAGEMENT TABLE

| <BRANCH> | 2001 | 2002 | 2003 | TOTAL (10K¥) |
|---|---|---|---|---|
| TOKYO | | | | |
| NAGOYA | | | | |
| OSAKA | | | | |
| TOTAL | | | | |

| ITEM NAME ENTRY FIELD | CATEGORY ENTRY FIELD | OUTPUT SOURCE DATA ADDRESS ENTRY FIELDS | OUTPUT SOURCE DATA ENTRY FIELDS |
|---|---|---|---|
|  |  |  |  |
|  |  |  |  |
|  |  |  |  |

FIG. 23

FILE MANAGEMENT TABLE

DESTINATION DOMESTIC

| BRANCH | 2001 | 2002 | 2003 | TOTAL (10K¥) |
|---|---|---|---|---|
| TOKYO | TOKYO-01 | TOKYO-02 | TOKYO-03 | 2563 |
| NAGOYA | NAGOYA-01 | NAGOYA-02 | NAGOYA-03 | 1748 |
| OSAKA | OSAKA-01 | OSAKA-02 | OSAKA-03 | 2132 |
| TOTAL | 2036 | 1982 | 2425 | 6443 |

FIG. 24

THE DATA BELOW IS TO BE MERGED WITH THE DATA FILE

ITEM NAME [BRANCH] DATA [NAGOYA]

ITEM NAME [YEAR] DATA [YEAR 2002]

DATA ARE ARRANGED ACCORDING TO THE SEQUENCE BELOW

[BRANCH] [YEAR] [PRODUCT CODE] [CATEGORY] [SALES AMMOUNT] [SALES]

[EXECUTE] [CANCEL]

121

FORMAT OF NAME DEFINITION DATA

A DATA FORMAT OF LINE/COLUMN SPECIFICATION INFORMATION

UNIT OF SALES IS K¥

(b)

(BLUE) (BLUE)
UNIT OF ⟨SALES⟩ IS [K¥]
(BLUE)

(c)

| | (BLUE) | (BLUE) | |
|---|---|---|---|
| ITEM | UNIT | EFFECTIVE DIGITS | |
| SALES | (BLUE) | (BLUE) | |
| UNIT PRICE | | | |
| (BLUE) | (BLUE) | (BLUE) | |

FIG. 30

| CATEGORY | USED TERM | CONVERSION RATE |
|---|---|---|
| MONEY AMMOUNT | YEN, ¥ | 1 |
| | KYEN, K¥ | 1000 |
| | 10KYEN, 10K¥ | 10000 |
| | ・・・ | ・・・ |
| | $, DOLLAR | 114 |
| | EURO | 138 |
| | ・・・ | ・・・ |
| | ・・・ | ・・・ |
| WEIGHT | G | 1 |
| | KG | 1000 |
| | ・・・ | ・・・ |
| | ・・・ | ・・・ |

FIG. 31

| FILE ID | ITEM NAME | UNIT | EFFECTIVE DEGITS |
|---|---|---|---|
| | | | |

INFORMATION PROCESSING DEVICE, FILE DATA MERGING METHOD, FILE NAMING METHOD, AND FILE DATA OUTPUT METHOD

BACKGROUND OF THE INVENTION

1. Field of the Invention

The invention relates to an information processing apparatus for handling many similar files.

2. Description of the Related Art

In recent years with the spread of the so-called GUI environment, applications wherein an end user handles many files(data-file, document file, etc.) are expanding. When an end user handles many files, we face first the problem of "the merge operation of file data of common condition with summed data-file" as mentioned later.

In general a data-summing process is often performed in such a stepwise way that summing is first performed by a segment unit such as a branch, a section, or a year and subsequently all summed data are assembled to acquire a total sum. For instance, usually data summed each product code are first summed each branch and each year, and next the first stage data summed each year and each branch are assembled to perform total sum.

In the data-summing process which is performed in a stepwise way as mentioned above, data which are fixed parameter in the first stage summing are usually excluded from a first stage sum data on the ground that they are shared by all constituent records of the file. For instance we can find cases wherein data the item of which is "branch" or "year" is not included in records of first stage summed data generated each branch and each year.

In the case as described above, when we perform the total data-summing process by assembling all the first stage summed data, we must take measures which incorporate the common data of the first stage summed files into the actual data of the data files which are to be assembled. That is, we must add record fields corresponding to items of the common parameter of the file, and enter the common parameter data in item.

For example, in handling CSV files spreading in recent years, the merging operation of common condition data of first stage summed files, as above described, is executed by the end user operation usually as follows. Explaining an example where each file is generated with "branch" and "year" being the common condition as described above, the merging operation is executed in such a way that new columns the index words of which are "branch" and "year" are inserted in the data file displayed in the form of the table format on a display and subsequently the same data of the common parameter are entered in all cells included in the inserted column. For example in the first stage summed file wherein "Osaka branch" and "2003 year" are the common condition, data "Osaka" and data "2003" are needed to be entered in all cells included in the corresponding columns.

The merging operation of the common condition data in the first stage summed file as described above is a daily job in data processing in general and numbers of the first stage summed files are usually by no means few. Therefore the operations are burdensome or onerous to end users whose primary role is more of various kind of data analysis using data summed up.

Furthermore problems which are troubling together when using many similar files such as the first stage summed files, we face a problem of naming for each file. As many files are to be named, the naming operation is first desired to be as easy or fuss-free as possible. By the reason now for example we used such a method that a definite number of characters are cut out automatically from the beginning of the file so as to be defined as the name. But on the other hand by such a kind of method as mentioned above we cannot identify or discriminate each file from many other similar files.

The primary requirement of the naming for files is that a user can recognize "what" each file is only by its name which is perceived first by a user. That is, the user can recognize directly from its name a combination of characteristic attributes of each file by which we can discriminate it from other files. Now naming for many files by which we can discriminate each file among a group of many similar files brings a great burden to end users as daily work.

Furthermore relating to the problem as described above, as what are troubling when end users handle data files, we face a problem with regard to the method of definition for data attributes such as a unit or a number of an effective digit of numerical data. Data constituting a data file are not complete until numerical data are combined with the attribute data such as unit data. Now when defining a unit for a CSV file, for example, users use a method wherein users only describe it on the file specification or another method wherein users assign a specified raw as the raw on which users describe the unit of each data and subsequently leave the interpretation and definition of the description to a program. But these methods both impose to users a burden which goes far beyond the range of end user operation when retrieving data from data-files and processing them.

BRIEF SUMMARY OF THE INVENTION

The handling of many similar files by end users as described above are first must be performed as speedy or as quickly as possible because they are often done as a part of so called non-routine work. Second they must need so few care and effort so as to be easy to perform as a daily or routine work. Furthermore they must be user-friendly or easy-to-understand as end user operations The present invention was conceived in view of the above problems and therefore an object of the present invention is to provide an information processing apparatus and a method of merging of file data wherein the merge operation of the common condition data of a file with the record data within a file can be performed fuss-freely, quickly and easy-to-understand as daily work.

Another object of the present invention is to provide an information processing apparatus and a method of naming for a file wherein a group of data files which share the same data configuration and in the other hand have respectively different file common conditions and other many similar files can be named so as to discriminate each file by its name and on the other hand the naming for files can be performed fuss-freely and quickly by users.

A further object of the present invention is to provide an information processing apparatus and a method of definition of file data attributes wherein definition of data attributes of data within a data file such as unit is performed by user-friendly or easy end-user operations.

The most natural and easy-to-understand method to users for managing many similar files is to manage files in the way each file is related to its characteristic attributes on a table format. So a further object of the present invention is to provide an information processing apparatus, a method of merging of file data, a method of naming for a file, and a method of definition of file data attributes, wherein the merging operation of the file common condition data or the naming operation for files as described above can be performed automatically only by managing files on a table format.

In order to achieve the above objects, a file data merging method in an information processing apparatus according to a first aspect of the invention comprises the steps of:

relating a data file to a specified cell on a table format;

relating an item name to data written in cells other than the cells related to the data files;

recognizing related data for a cell related to a data file are recognized among written data related to item names on the basis of the arrangement rule of data on a table, related data meaning data to be concurrently referenced with the data in the cell; and adding the related data recognized for the cell related to the data file to each record constituting the data file as common condition data.

The file data merging method in the information processing apparatus according to a second aspect of the invention is the method according to the first aspect, wherein the specified cell on table format is related to a data file by pasting an icon representing the data file into the cell in a display.

The file data merging method in the information processing apparatus according to a third aspect of the invention is the method according to the second aspect, wherein the specified term which indicates a cell to be related to a data file is registered in a specified dictionary means and is related to a cell related to a data file.

The file data merging method in the information processing apparatus according to a fourth aspect of the invention is the method according to the first aspect, wherein a term registered in the dictionary means as described above is written in a table format, being related to a cell to which a data file correlated and subsequently is given a graphical feature indicating that the term is registered in the dictionary means.

The file naming method in the information processing apparatus according to a fifth aspect of the invention comprises:

pasting an icon into a cell on a table format;

reading the related data character strings to be referenced concurrently with the data in the cell among written data on the table format on the basis of the arrangement rule of data on a table format; and arranging the related data character strings or the related data conversion character strings which are converted by a first predetermined rule from the related data character strings by a second predetermined rule to generate the name for the file corresponding to the icon.

The file naming method in the information processing apparatus according to a sixth aspect of the invention is the method according to the fifth aspect, further comprising the steps of:

giving a name to the file the icon of which is pasted into a cell on a table format;

reading the related data character strings for said cell from the table format; and recognizing the related data character strings or the related data conversion character strings in the name character string, wherein the first rule by which the related data conversion character strings are acquired are recognized by comparing the related data character strings or the related data character conversion strings recognized from the name string given as described above with the related data character strings read from the table format.

The file naming method in the information processing apparatus according to a seventh aspect of the invention is the method according to the fifth aspect, further comprising the steps of:

relating an item name to a position in a template character string arbitrarily made into which the related data character string or the related data conversion character string is to be inserted;

reading the related data character string for the cell to which the icon of said file related, related to the corresponding item name from the table format based on the arrangement rule of data on a table format;

selecting at each inserting position a related data character string the item name of which is the same as the item name related to the inserting position; and disposing the selected related data character strings or the related character conversion strings of it at the corresponding inserting position to acquire the name character string.

The file naming method in the information processing apparatus according an eighth aspect of to the invention is the method according to the fifth aspect, further comprising the steps of:

relating a line position or a column position of the table to each inserting position of related data character strings or the related character conversion strings in a template character string arbitrarily made;

reading the related data character string for the cell to which the icon of said file is related from the table format based on the arrangement rule of data on a table format;

relating the read related data character string the line position in which it is written if the related data character string is located on the upper side of the cell, and is related to the column position in which it is written if the related data character string is located on the left side of the cell;

selecting a related data character string an line position or a column position of which is the same as the line position or a column position related to the inserting position from the related data character strings or the related data character conversion strings read for the cell at each inserting position of a related data character string or a related data character conversion string in the template character string; and disposing the selected related data character strings or the related character conversion strings at the corresponding inserting position to acquire the name character string.

The file data outputting method in the information processing apparatus according to a ninth aspect of the invention comprises the steps of:

pasting an icon representing a data file onto a document;

reading data attribute information including at least unit and number of an effective digit of numerical data with regard to data constituting the data file among written information on the document;

relating the icon to the read written information on the document; and outputting the combination of the read attribute information and the corresponding numerical data stored in the data file as data within said data file.

In order to achieve the above objects, an information processing apparatus according to a tenth aspect of the invention comprises:

a means that relates a data file to a specified cell on a table format;

a means that relates an item name to data written in cells other than the cells related to the data files;

a means that recognizes related data for a cell related to a data file are recognized among written data related to item names on the basis of the arrangement rule of data on a table, related data meaning data to be concurrently referenced with the data in the cell; and a means that adds the related data recognized for the cell related to the data file to each record constituting the data file as common condition data.

The information processing apparatus according to an eleventh aspect of the invention is the information processing apparatus according to the tenth aspect, wherein the specified cell on table format is related to a data file by pasting an icon representing the data file into the cell in a display.

The information processing apparatus according to a twelfth aspect of the invention is the information processing apparatus according to the eleventh aspect, wherein the specified term which indicates a cell to be related to a data file is registered in a specified dictionary means and is related to a cell related to a data file.

The information processing apparatus according to a thirteenth aspect of the invention is the information processing apparatus according to the twelfth aspect, wherein a term registered in the dictionary means as described above is written in a table format, being related to a cell to which a data file correlated and subsequently is given a graphical feature indicating that the term is registered in the dictionary means.

The file naming method in the information processing apparatus according to a fourteenth aspect of the invention comprises:

a means that pastes an icon into a cell on a table format;

a means that reads the related data character strings to be referenced concurrently with the data in the cell among written data on the table format on the basis of the arrangement rule of data on a table format; and a means that arranges the related data character strings or the related data conversion character strings which are converted by a first predetermined rule from the related data character strings by a second predetermined rule to generate the name for the file corresponding to the icon.

The information processing apparatus according to a fifteenth aspect of the invention is the information processing apparatus according to the fourteenth aspect, further comprising:

a means that gives a name to the file the icon of which is pasted into a cell on a table format;

a means that reads the related data character strings for said cell from the table format; and a means that recognizes the related data character strings or the related data conversion character strings in the name character string, wherein the first rule by which the related data conversion character strings are acquired are recognized by comparing the related data character strings or the related data character conversion strings recognized from the name string given as described above with the related data character strings read from the table format.

The information processing apparatus according to a sixteenth aspect of the invention is the information processing apparatus according to the fourteenth aspect, further comprising:

a means that relates an item name to a position in a template character string arbitrarily made into which the related data character string or the related data conversion character string is to be inserted;

a means that reads the related data character string for the cell to which the icon of said file related, related to the corresponding item name from the table format based on the arrangement rule of data on a table format;

a means that selects at each inserting position a related data character string the item name of which is the same as the item name related to the inserting position; and a means that disposes the selected related data character strings or the related character conversion strings of it at the corresponding inserting position to acquire the name character string.

The information processing apparatus according to a seventeenth aspect of the invention is the information processing apparatus according to the fourteenth aspect, further comprising:

a means that relates a line position or a column position of the table to each inserting position of related data character strings or the related character conversion strings in a template character string arbitrarily made;

a means that reads the related data character string for the cell to which the icon of said file is related from the table format based on the arrangement rule of data on a table format;

a means that relates the read related data character string the line position in which it is written if the related data character string is located on the upper side of the cell, and is related to the column position in which it is written if the related data character string is located on the left side of the cell;

a means that selects a related data character string an line position or a column position of which is the same as the line position or a column position related to the inserting position from the related data character strings or the related data character conversion strings read for the cell at each inserting position of a related data character string or a related data character conversion string in the template character string; and a means that disposes the selected related data character strings or the related character conversion strings at the corresponding inserting position to acquire the name character string.

The information processing apparatus according to an eighteenth aspect of the invention comprises:

a means that pastes an icon representing a data file onto a document;

a means that reads data attribute information including at least unit and number of an effective digit of numerical data with regard to data constituting the data file among written information on the document;

a means that relates the icon to the read written information on the document; and a means that outputs the combination of the read attribute information and the corresponding numerical data stored in the data file as data within said data file.

A computer control program and/or a medium encoded with the program for use with a computer for performing a file data merging method in an information processing apparatus according to a nineteenth aspect of the invention comprises:

relating a data file to a specified cell on a table format;

relating an item name to data written in cells other than the cells related to the data files;

recognizing related data for a cell related to a data file are recognized among written data related to item names on the basis of the arrangement rule of data on a table, related data meaning data to be concurrently referenced with the data in the cell; and adding the related data recognized for the cell related to the data file to each record constituting the data file as common condition data.

A computer control program and/or a medium encoded with the program for use with a computer for performing a method in an information processing apparatus according to a twentieth aspect of the invention is the computer control program and/or a medium encoded with the program for use with a computer for performing a method in an information processing apparatus according to the nineteenth aspect of the invention, wherein the specified cell on table format is related to a data file by pasting an icon representing the data file into the cell in a display.

A computer control program and/or a medium encoded with the program for use with a computer for performing a file naming method in an information processing apparatus according to a twenty first aspect of the invention comprises:

pasting an icon into a cell on a table format;

reading the related data character strings to be referenced concurrently with the data in the cell among written data on the table format on the basis of the arrangement rule of data on a table format; and arranging the related data character strings or the related data conversion character strings which are converted by a first predetermined rule from the related data character strings by a second predetermined rule to generate the name for the file corresponding to the icon.

A computer control program and/or a medium encoded with the program for use with a computer for performing a file naming method in an information processing apparatus according to a twenty second aspect of the invention comprises:

pasting an icon representing a data file onto a document;

reading data attribute information including at least unit and number of an effective digit of numerical data with regard to data constituting the data file among written information on the document;

relating the icon to the read written information on the document; and outputting the combination of the read attribute information and the corresponding numerical data stored in the data file as data within said data file.

As described above, according to the present invention, the merging operation of file common condition data with record-data within a file and the naming operation for files which require hitherto fair effort and time can be performed by entering file identifying name or by pasting the corresponding icon into a table form to which format definition by easy operation has given, and therefore significant reduction of effort and time for the operation is expected.

Furthermore according to the present invention, the merging operation of file common condition data with record-data within the file and the naming operation for files can be performed automatically only by storing or managing a file being co-related with the characteristics attributes of it on a table form, which is most natural and easy-to-understand method to users in managing many similar files, and therefore they can be performed without particular burden and easily to understand to users.

Furthermore according to the present invention, the naming for files is performed with contents which are naturally read on a table form wherein the file and its characteristic attributes are co-related to each other, and therefore the most on-target naming for discriminating each file is acquired.

Furthermore according to the present invention, the definition of the data attributes of data within data files such as unit is performed using directly character strings inputted for human perception on the table form on which the corresponding icon of the file is pasted, and therefore it can be performed as end-user operation with no particular burden and with much easiness to understand for users.

BRIEF DESCRIPTION OF THE DRAWINGS

FIG. 5 depicts a format of a file management table in the system of the embodiment;

FIG. 7 depicts a format of a second file management table in the system of the embodiment;

FIG. 10 depicts an example of a data format of cell data in the system of the embodiment;

FIG. 11 depicts a list of definition element symbols in the system of the embodiment;

FIG. 12 depicts an example of terms included in an applied term dictionary in the system of the embodiment;

FIG. 17 depicts an example of an item name specification screen in the system of the embodiment;

FIGS. 18(a) and 18(b) depict a file management table with format definitions added in the system of the embodiment;

FIG. 22 depicts a configuration of a merge work table in the system of the embodiment;

FIG. 23 depicts a format of a third file management table in the system of the embodiment;

FIG. 24 depicts an example of a confirmation screen of a related data merge function for a data file having an icon pasted in a table in the system of the embodiment;

FIG. 29 depicts an example of a data attribute specifying method using a comment in the system of the embodiment;

FIG. 30 depicts an example of a configuration of a term representing "unit" in the applied term dictionary in the system of the embodiment; and FIG. 31 depicts an example of a data format of data attribute definition data in the system of the embodiment.

Figure 1:
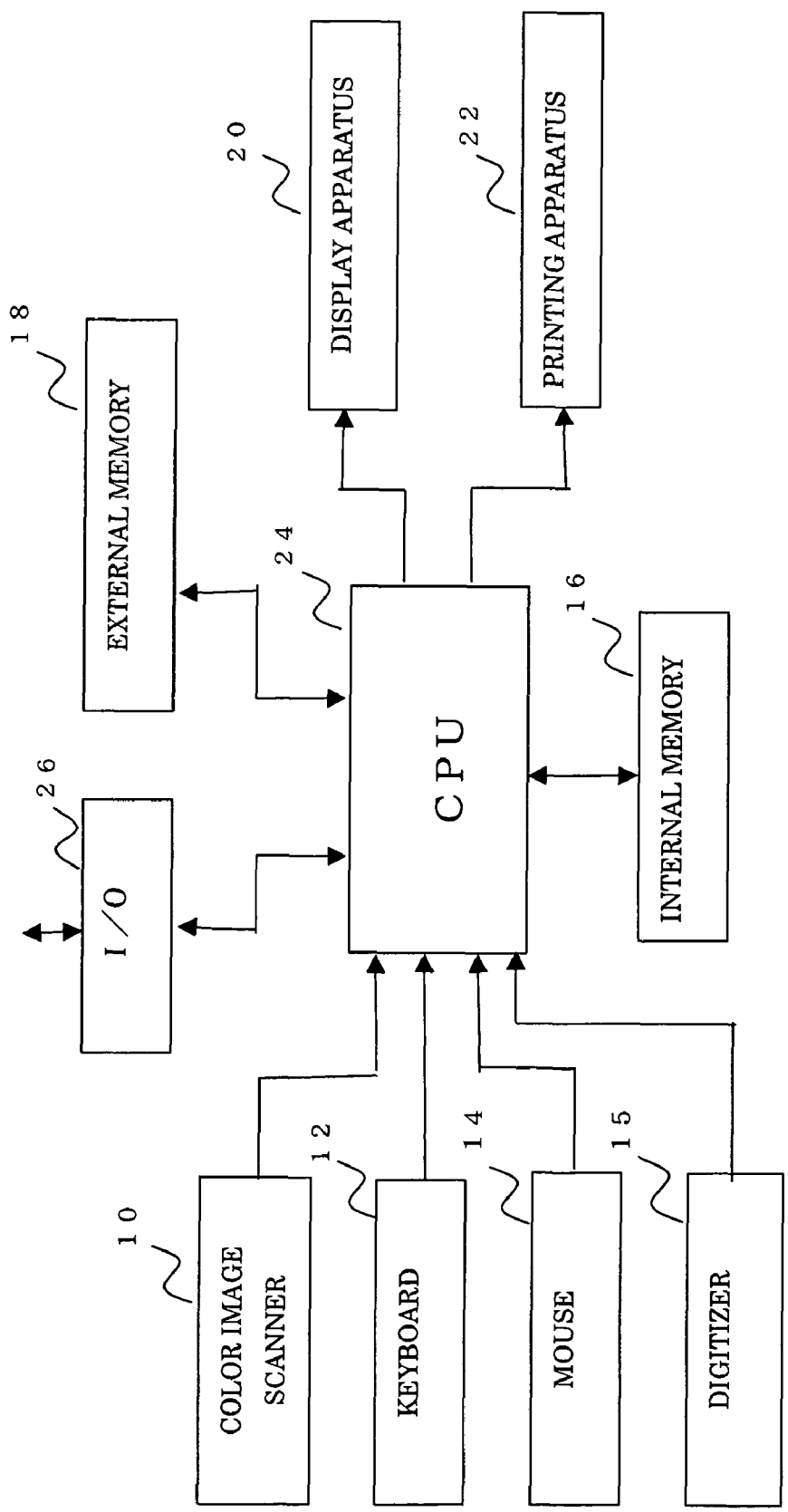
FIG. 1 is a block diagram of an example of a system configuration on hardware of an information processing apparatus according to one embodiment of the present invention.

EXPLANATIONS OF LETTERS OR NUMERALS 10 color image scanner
12 keyboard 14 mouse
15 digitizer
18 internal memory
18 external memory
20 displaying apparatus
24 CPU
27 communicating apparatus
31 main menu
32 application menu
33 tabulation process application screen
37 document creating unit
39 document data storage unit
40 file data storage unit
42 file-to-be-merged fetching unit
46 file-to-be-merged storage unit
48 merge file storage unit
50 definition specifying unit
52 applied term dictionary
54 definition data storage unit
60 table record extracting unit
62 data merging portion
90 definition sub-screen
94 execution button
101 item name entry field
103 registered item-name entry field
105 data name entry field
107 field format specification field
109 end button
111 item-name candidate menu
115 output data file name input field
117 file format input field
119 execution button
121 execution button
131 name entry field
141 data field (index word entry field)
142 file quote field
143 icon

DETAILED DESCRIPTION OF THE INVENTION

FIG. 1 depicts a system configuration on hardware of an information processing apparatus according to one embodiment of the present invention. This system includes a color image scanner 10, a keyboard 12, a mouse 14, and a digitizer 15 acting as input apparatuses, an internal memory 16 and an external memory 18 acting as storage apparatuses, and a displaying apparatus and a printing apparatus 22 acting as output apparatuses, which are connected to a CPU 24 through appropriate interface circuits (not shown). The CPU 24 is also connected to a telephone line or communication line 27 through a communicating apparatus 26.

The color image scanner 10 reads characters, symbols, and graphics in a document written on a paper sheet as color image information. The internal memory 16 and the external memory 18 have stored thereon various programs regulating processes and control operations of the CPU 24 as well as various electronic dictionaries, character fonts, files, etc. The communicating apparatus 26 has a facsimile communication function.

Figure 2:
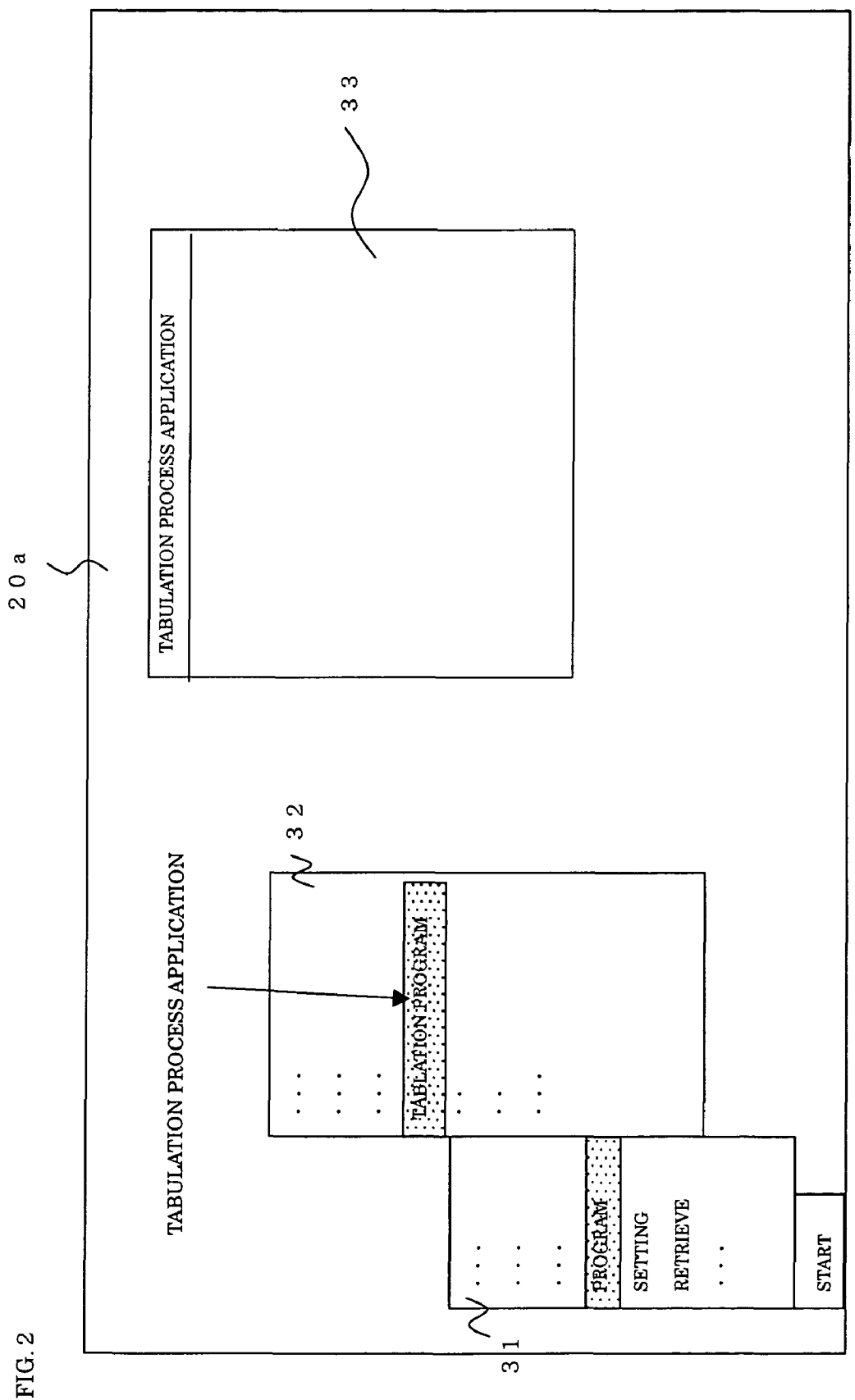
FIG. 2 depicts a desktop screen displayed by an environment controlling program in a system of the embodiment.

When the apparatus is powered on, an environment control program controlling a GUI environment of the apparatus is automatically activated to display, for example, a desktop screen shown in FIG. 2 on a display screen 20a of the displaying apparatus 20.

If a "start" button always displayed at the lower left corner is selected and specified on this desktop screen, a "main menu" 31 having a list of selection buttons such as "program", "set", and "retrieve" appears on the display screen 20a, and if a "program" button is clicked and specified on this "main menu" 31, a "program menu" 32 showing a list of application programs installed on the apparatus appears on the display screen 20a. FIG. 2 depicts a state after clicking and specifying the "program menu" to display the "program menu" 32.

Figure 3:
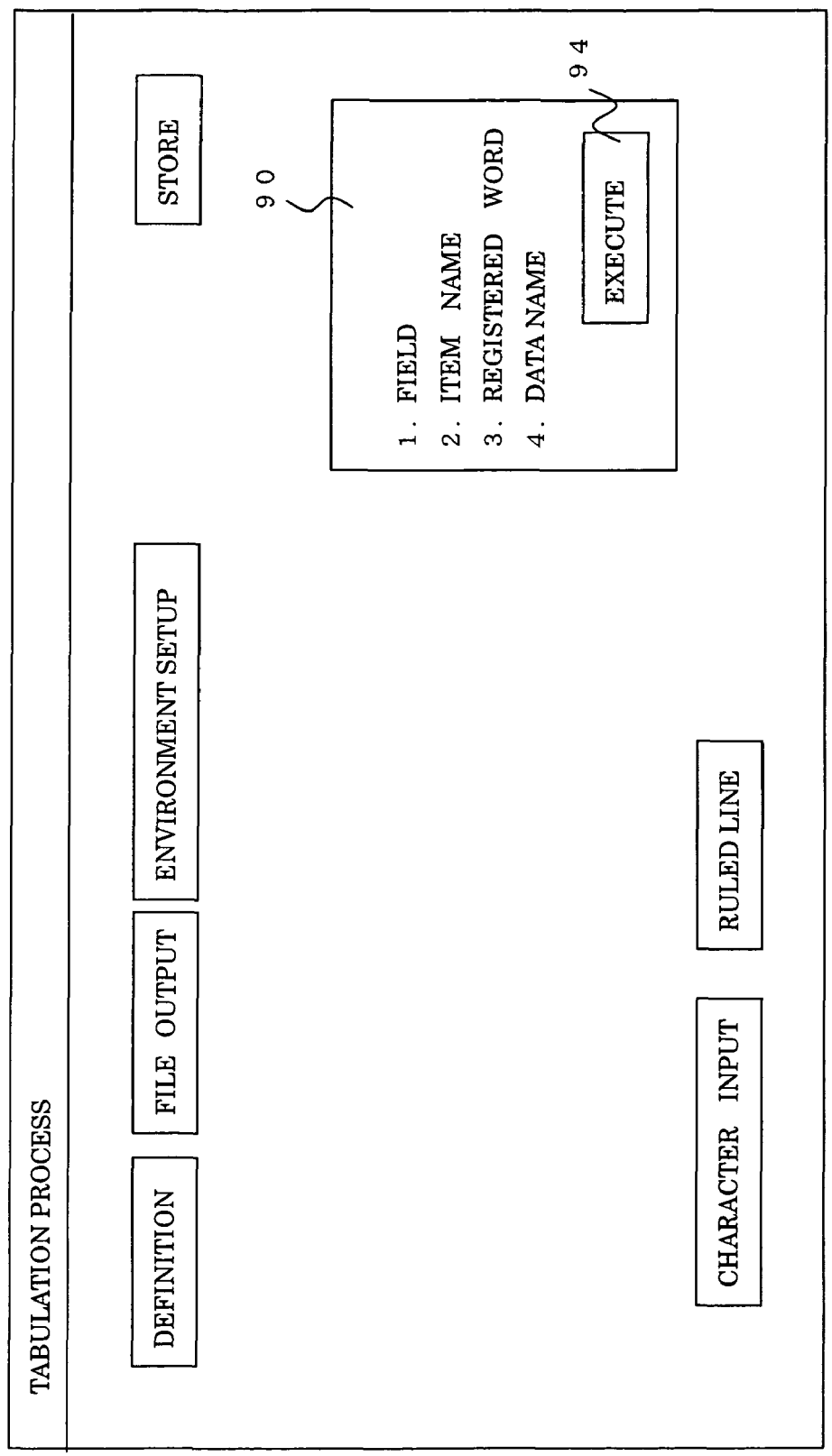
FIG. 3 depicts a tabulation process application screen in the system of the embodiment.

If a corresponding button is clicked and specified for a "tabulation process application program" that is an application program controlling a function related to the present invention, the environment control program fetches a source program of the "tabulation process application program" from a predetermined storage position on the external memory 18 of the apparatus, activates the program after deploying the program in the execution format on an appropriate area of the external memory 16, and displays, for example, a tabulation process application screen 33 shown in FIG. 3 on the display screen 20a.

The tabulation process application is provided with functions related to the present invention, such as "document creation", "definition", "file output", and "environment setup". The document creation function enables a user to freely create documents including tables with the use of a "character input" button and a "ruled line" button always displayed on the tabulation process application screen 33.

The format defining function enables a format of a table to be defined as a data format such that data with a defined item name may uniquely be fetched from various table documents arbitrarily created by a user on the tabulation process application screen 33. This is performed with the use of a menu on a sub-screen 90 (described later) displayed by specifying a "definition" button always displayed on the tabulation process application screen 33.

The file output function enables data fetched from a format-defined table to be fetched as a data file in a desired format. This is performed with the use of a menu on the sub-screen 90 displayed by specifying a "file output" button always displayed on the tabulation process application screen 33.

The environment setup function enables a user to perform functions such as setting colors and line types added to differentiate character strings and ruled lines additionally entered for the format definition from originally entered character strings and ruled lines at the time of the format definition. This is performed with the use of a sub-screen (not shown) displayed by specifying an "environment setup" button always displayed on the tabulation process application screen 33.

Figure 4:
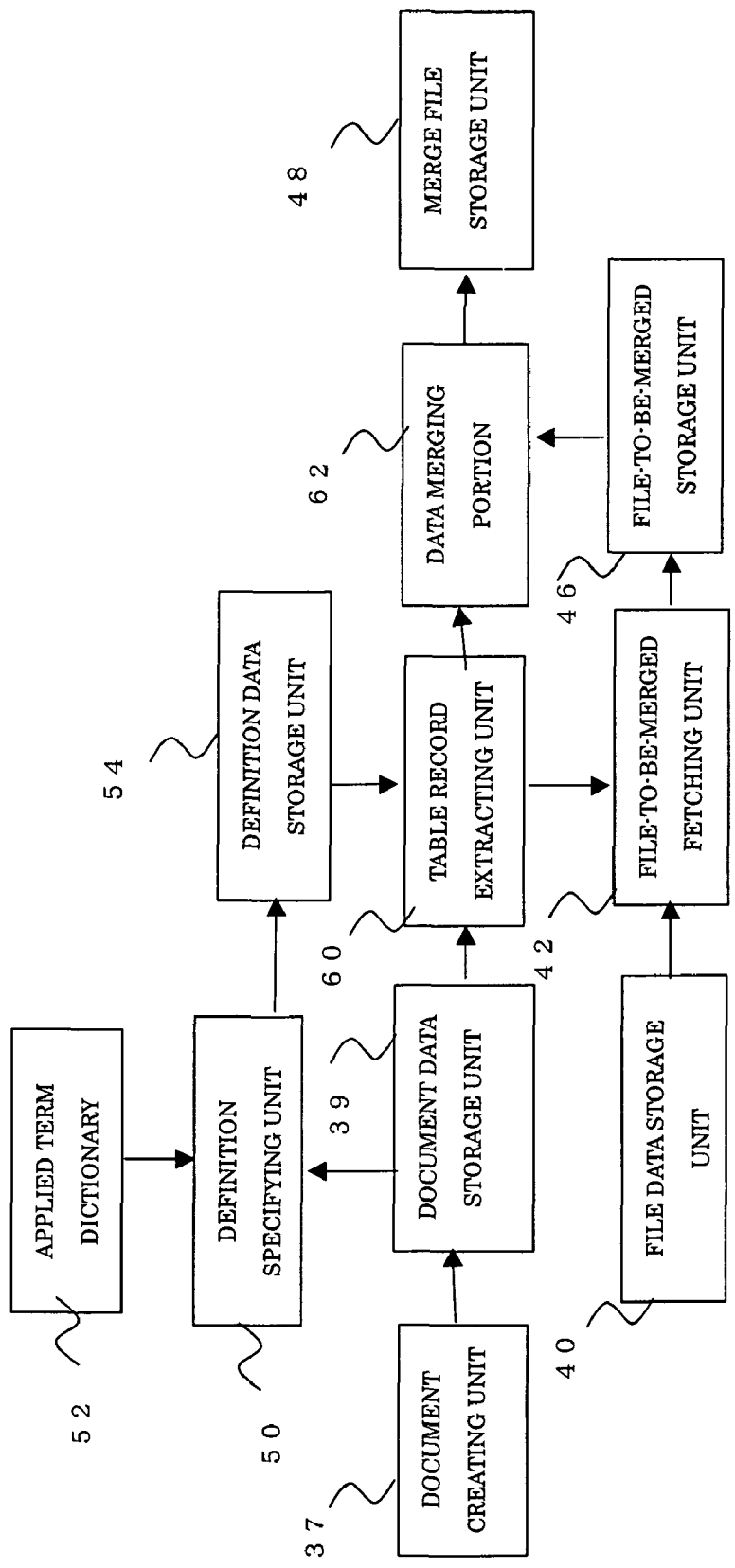
FIG. 4 is a block diagram of an inventive functional configuration in the system of the embodiment.

The above functions are implemented by a system where the tabulation process application program cooperatively operates with the environment control program and the hardware making up the apparatus. FIG. 4 shows a functional configuration related to the present invention of the embodiment system.

A document creating unit 37 is made up of the input apparatuses such as the color image scanner 10, the keyboard 12, the mouse 14, and the digitizer 15, the CPU 24 that executes a document creation routine, the internal memory 16 that temporarily imports input information for document creation, and the displaying apparatus 20 that displays and outputs a created document under the control of the CPU 24. A document data storage unit 39 uses a storage area of the internal memory 16 or the external memory 18.

A file data storage unit 40 is deployed on a predetermined storage area of the external memory 18. A file-to-be-merged fetching unit 42 is made up of the CPU 24 executing a data-file-to-be-merged fetching process. A file-to-be-merged storage unit 46 and a merge file storage unit 48 are deployed on predetermined storage areas of the internal memory 16.

A definition specifying unit 50 is made up of the input apparatuses such as the color image scanner 10, the keyboard 12, the mouse 14, and the digitizer 15, the CPU 24 that executes a definition data generating process, the internal memory 16 that temporarily imports input information for definition specification, and the displaying apparatus 20 that displays and outputs details of the definition specification under the control of the CPU 24. An applied term dictionary 52 uses a storage area of the internal memory 16 or the external memory 18. A definition data storage unit 54 is deployed on a predetermined storage area of the internal memory 16 or the external memory 18.

A table record extracting unit 60 is made up of the CPU 24 that executes a table record extracting process and the internal memory 16 that have the extracted table record temporarily stored thereon. A data merging portion 62 is made up of the CPU 24 that executes a data merging process and the internal memory 16 that have the created merge record temporarily stored thereon.

Details of functions related to the present invention of the embodiment apparatus will first be described with reference to an example of a data file management table shown in FIG. 5. "YEAR 2001", "YEAR 2002", and "YEAR 2003" are entered in a first line from the top of the data file management table as data names of a common condition "YEAR" of management target data files, and "TOKYO", "NAGOYA", and "OSAKA" are entered in a first line from the left as data names of a common condition "BRANCH" of the management target data files.

It is assumed that totals of sale amounts are entered in constituent cells of the lowest line and the rightmost column, which are user's remarks fields. For example, a total sale amount is entered in a cell of a second line of the rightmost column for "TOKYO" of the item "BRANCH" and "YEAR 2001", "YEAR 2002", and "YEAR 2003" of the item "YEAR". A matrix of cells of second and subsequent lines and second and subsequent columns of the table is file quote fields where file identification names "TOKYO-01", "TOKYO-02", etc, of the management target data files are entered, and among the cells, for example, a file identification number "NAGOYA-02" is entered in a cell at the intersection point of the column with "YEAR 2002" entered and the line with "NAGOYA" entered for a data file having the file common conditions of "YEAR 2002" for the item "YEAR" and "NAGOYA" for the item "BRANCH".

Figure 6:
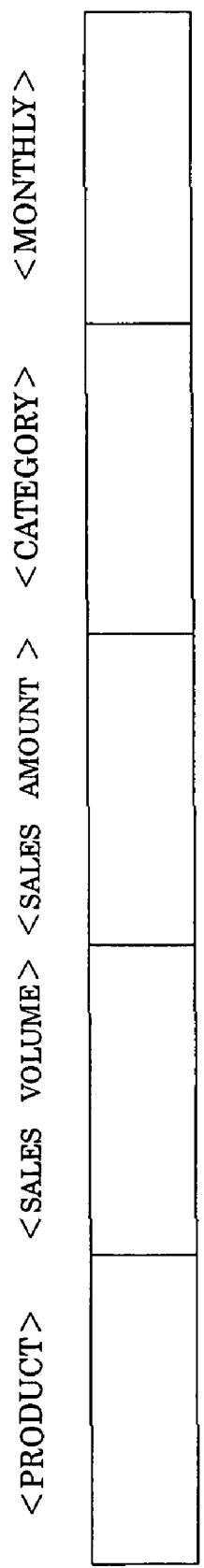
FIG. 6 depicts an exemplary configuration of an output source file in the system of the embodiment.

It is assumed here that a user has nine data files created as shown in FIG. 5. Each of the data files consists of records of "PRODUCT", "SALES VOLUME", "SALES AMOUNT", "CATEGORY", AND "MONTHLY" having a common data configuration shown in FIG. 6, and is created for the same years and branches, which are the file common conditions. The common conditions, i.e., the items "YEAR" and "BRANCH" are not included in record constituent data, which are actual data of the data files.

Each of the above data files is managed in a form of a file, which is a unit of data handling of the environment control program in the system and is assumed to be stored as, for example, a CSV-format data file at a predetermined position in the file data storage unit 40 allocated in the external memory 18.

In the file quote fields of the file management table, identification names for a user are entered as file management names of corresponding data files of the environment control program, excluding a file type specification part ".csv". If user names obtained by excluding the file type specification part from the file management names are not unique from the viewpoint of the system, the entire file management names are directly entered. User identification names easy-to-understand for a user may particularly be provided and the user identification names may be entered after setting a table correlating the user identification names with the file management names in the system.

When looking at this file management table, a user naturally understands that the file common condition of each of the data files is a combination of a data name of the item "BRANCH" entered in the same line and a data name of the item "YEAR" entered in the same column as the file name entry position. In general, when managing a plurality of data files having the same data configuration and the file common conditions different from each other, an easy-to-understand method for a user is to correlate the common condition parameters of the data files with the data files in a table format as above. In this system, this file management table format may freely be created for user-friendliness. The table managing the data files may be a table as shown in FIG. 7, for example.

A user uses the document creating function to create the data file management table shown in FIG. 5 in the embodiment apparatus. A document including a table may freely be created on the tabulation process application screen 33 shown in FIG. 3 with a known method using the "character input" button, the "ruled line" button, etc., always displayed in the lower edge portion.

For example, after clicking and specifying the "character input" button, if a mouse pointer is positioned and clicked at a target position and characters are then input through the keyboard 12, a character string is generated on the document with the beginning position that is the click position. After clicking and specifying the "ruled line" button, if the mouse pointer is positioned and clicked at a target position and the mouse pointer is moved while the mouse 14 is pressed down, a ruled line is drawn on the document with the both ends that are the click position and the press-down released position of the mouse 14.

The document creating unit 37 of the system creates character string data, for example, in a format shown in FIG. 8 after a certain routine started in response to the specification of the "character input" button recognizes the subsequently clicked position as the beginning position of the target character string. For example, ruled line data in a format shown in FIG. 9 are created after a certain routine started in response to the specification of the "ruled line" button recognizes the subsequently clicked position and the press-down released position as the both end positions of the target ruled line.

Set values preset in the apparatus may be registered for information such as character pitches, character types, and character sizes in the character string data. Default set value may similarly be registered for information such as line types in the ruled line data.

Information created and displayed on one tabulation process application screen is managed by the environment control program as one piece of file information linked to the tabulation process application program. The ruled line data and the character string data created as above are stored in the document data storage unit 39 in a certain area of the internal memory 16 allocated to the file information corresponding to the tabulation process application screen 33.

A document creating method of the embodiment apparatus may be a method of creating a desired document on a paper sheet to input an image into the system. When a user inputs image data of a paper sheet through the scanner 10 of the apparatus, the system uses the known character recognizing and ruled-line recognizing functions to recognize character strings and ruled lines entered in the paper sheet to create and store corresponding character string data and ruled line data into the relevant document data storage unit 39.

The format defining function of the system will then be described. The file management table format may freely be created for user-friendliness as above.

The format defining function is instead performed to fetch data from a freely created table format without multiple meanings in a fixed form.

The format defining function may continuously be performed after the document creating operation described above or may be performed when a corresponding icon is opened again on the display 20*a* after a document is created and once saved on the external memory 18.

The created document may be saved by clicking and specifying a "save" button always displayed on the upper right side of the tabulation process application screen 33. If a saved name is input on a subsequently displayed save operation guide screen (not shown) and an "execution" button on the save operation guide screen is specified, all the pieces of relevant data including the created data of the currently activated tabulation process application are stored as one piece of file information at an appropriate position in the file data storage unit 40 of the external memory 18, and an icon representing the corresponding file information of the tabulation process application is displayed on the display 20*a* instead. The document data storage unit 39 provided in the allocated area of the corresponding file information in the internal memory 16 is also saved in a predetermined area within a corresponding file information storage area provided in the external memory 18.

The saved document may be opened by double-clicking the corresponding icon on the display screen 20*a*. In response to this open operation, after the corresponding file information stored in the external memory 18 is loaded into an area allocated in the internal memory 16, the tabulation process application screen 33 is displayed on the display 20*a* and the corresponding tabulation process application program is activated. The activated tabulation process application program displays storage contents of the document data storage unit 39 provided in the load allocation area in the tabulation process application screen 33.

It is assumed here that the table shown in FIG. 5 is created and displayed on the tabulation process application screen 33 on the display screen 20*a*. When a user clicks the "definition" button always displayed on the upper side of the tabulation process application screen 33, the definition specifying unit 50 performs the following procedure in response to this specification.

After recognizing cells that are rectangular areas serving as unitary data entry areas on the table, cell data are created for respective recognized cells to define the cells and are stored in a predetermined area of the definition data storage unit 54. FIG. 10 shows an exemplary format of "cell data" representing one cell.

For example, cells are detected on the table as follows. if a table is made up of ruled lines as in this example, the ruled line data of ruled lines making up the table are sequentially fetched to obtain the ruled-line positions delimited by the ruled lines or the extensions thereof in both the vertical and horizontal directions of the document. It is then searched whether each of four sides is a ruled-line portion for each grid of a matrix generated by these ruled-line positions; if a side is a ruled-line portion, the side is defined as a cell boundary; if a side is not a ruled-line portion, an adjacent grid of the corresponding direction is merged; and the same determination is repeated for the merged grid to identify four boundaries of a cell.

The system subsequently identifies the data character strings entered in all the cells on the table format and sets the addresses of the character string data into a "character string data address portion" in the corresponding cell data. The system also stores text code data in the character string data of the character strings entered in the cells into a "data-in-cell storage portion" in the corresponding cell data.

The character strings entered in the cells may be identified in a known method by repeatedly checking cell data position information of a corresponding cell with position information of the character string data on the document.

After the cell data are created as above for all the cells on the table, the definition specifying unit 50 and the system then display the sub-screen 90 on the tabulation process application screen 33 to guide a user through the table format defining operation. The sub-screen 90 lists various definition items such as "1. FIELD", "2. ITEM NAME", and "3. DATA NAME" as shown in FIG. 3.

In the table format defining operation, ranges and corresponding item names are specified for the file quote fields and the file common condition parameter entry areas on the table. The operation is performed by repeatedly clicking and specifying consecutive cell columns with the same item name and a character string of the item name one-by-one on the table and then specifying the respective corresponding definition item categories (such as "1. FIELD", "2. ITEM NAME", and "3. REGISTERED WORD") on the sub-screen 90. The above individual specification operations may be performed in an arbitrary order. A data field made up of consecutive cell columns defined with one item name is referred to as an item-defined data field in this description.

For example, the character string and the cell columns may differently be clicked and specified as in a known method as follows. The cell columns may be clicked and specified by a so-called drag operation, i.e., by bringing the mouse pointer to the cell columns to be specified and tracing the cell columns to be specified while the left button of the mouse 14 is clicked and pressed down.

The character string may be clicked and specified by bringing the mouse pointer to the character string to be specified, double-clicking and pressing down the left button of the mouse 14 to shift the system to a character string cursor display mode (character string specification mode), and then performing the drag operation of tracing the character string portion to be specified while the left button of the mouse 14 is pressed down.

If the entry of an item name is omitted on the table, a corresponding item name character string is additionally entered in a blank space adjacent to the upper or left side of the cell column direction of the corresponding data field area. The position adjacent to the upper or left side of the cell column direction of the corresponding data field area is particularly referred to as a "specific adjacent position" in this description. If no blank space exists at the "specific adjacent position" of the corresponding data field area, the character string may additionally be entered in an arbitrary blank space outside of the table adjacent to the corresponding data field area.

With regard to the correlation between item names and data fields, it is first assumed in an agreement with users that the system considers a character string specified to the "2. ITEM NAME" located at the "specific adjacent position" as a corresponding item name for a data field area specified to the "1. FIELD". Subsequently, if a character string specified to the "2. ITEM NAME" is not located at the "specific adjacent position" of a data field area specified to the "1. FIELD", a character string specified to the "2. ITEM NAME" adjacent to the corresponding data field area is considered as a corresponding item name.

If correlation between data fields and item names is not uniquely determined in the above procedure, a "linking line", i.e., a symbol specifically reserved in the system is drawn as a symbol correlating both relevant elements for an appropriate one of combinations of data fields and item names.

Certain symbols, graphics, or graphical features (such as background patterns) are reserved in this system and are correlated to and used for certain respective meanings in the format definition. FIG. 11 shows examples of definition element symbols that are specific reserved symbols. In this case, a line segment corresponds to the "linking line" that correlates constituent elements of definition with each other in the document. A table (not shown) correlating types of symbols and graphics with definition meanings is created in the definition specifying unit 50 of the system.

Character strings and line segments entered in the "definition mode" with the "definition" button specified may be "definition entry information" entered for the format definition handled differently from the entry information of the originally entered characters and strings. The "definition entry information" is stored in a specifically determined area in the document data storage unit 39 and is entered with modification information automatically added, which is preliminarily allocated to the "definition entry information".

The modification information is allocated to the "definition entry information" on an "environment setting" screen (not shown) displayed by specifying an "environment setting" button on the tabulation process application screen 33. In the case of this example, the "definition entry information" is differentiated by adding (blue) color. The additionally entered character strings and the line segments drawn for the above "linking lines" in the definition mode are entered as the (blue) colored "definition entry information" differentiated from the originally entered character strings and line segments.

If it is desirable to simply give a name to a data field in the above item name specifying operation, the "2. ITEM NAME" is selected when specifying the definition item category. If it is desirable to cause a certain process in accordance with an item name, the definition category "3. REGISTRATION WORD" is selected.

In the case of this example, a character string "BRANCH" entered adjacently to the upper side is directly used for a heading as an item name of a file common condition entry area of the first column of the table and is clicked and specified before the "2. ITEM NAME" is specified on the sub-screen 90.

Since no heading is entered for an item name of a file common condition entry area of the first line of the table, a character string "YEAR" is additionally added at an arbitrary position outside of the table adjacent to the first line of the table and the "2. ITEM NAME" is similarly specified on the sub-screen 90.

For the item name of the file quote field, first, a term "FILE NAME" registered in the applied term dictionary 52 is additionally entered in an arbitrary blank space outside of the table and a linking line is drawn to link an arbitrary position within the corresponding file quote field area. The additionally entered item name character string "FILE NAME" is then clicked and specified and the "3. REGISTERED WORD" is specified on the sub-screen 90.

Figure 13:
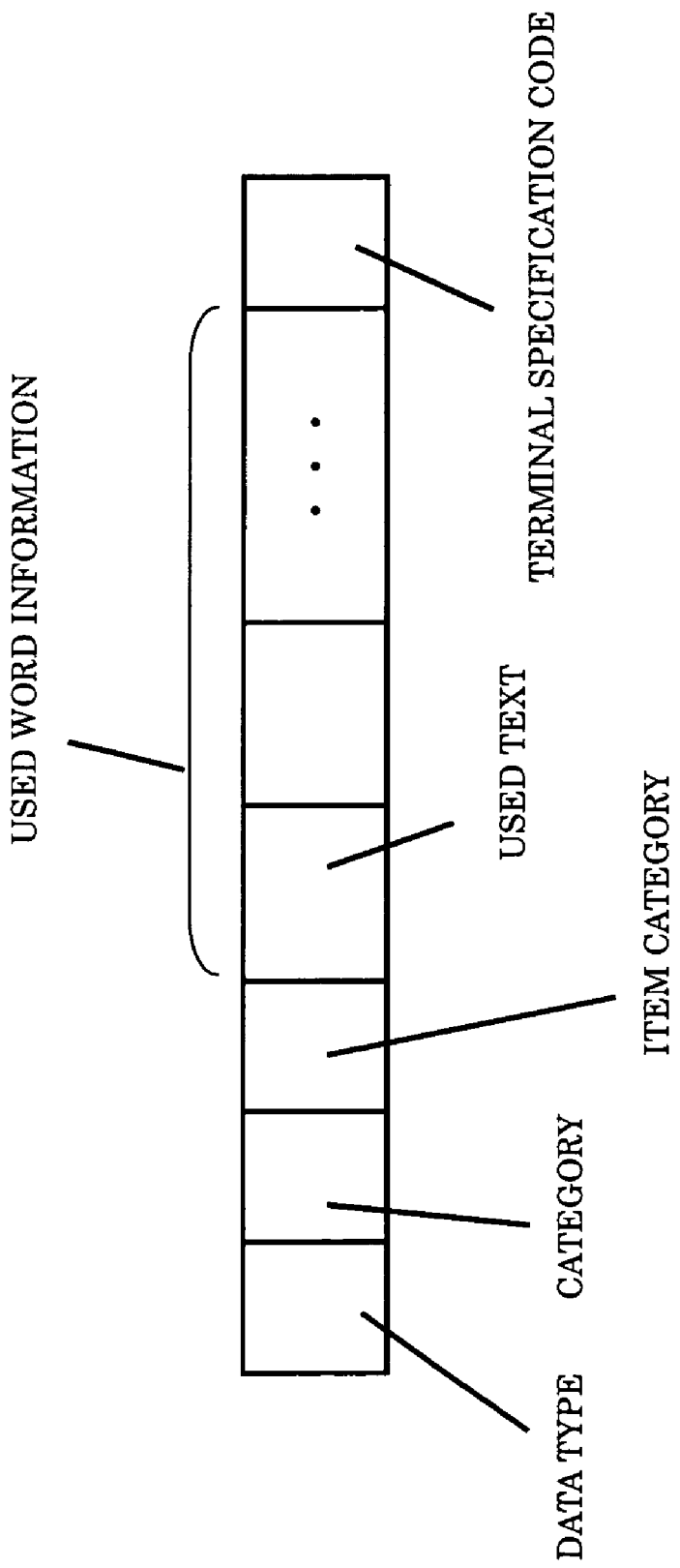
FIG. 13 depicts an example of a data format of "applied term definition data" in the system of the embodiment.

This system registers certain terms usually used by a user for the interfaces between humans into the applied term dictionary 52, which is a specific dictionary means capable of being referenced by both a user and the system and having registered meanings defined in accordance with usually understood meanings of the terms. FIG. 12 shows an example of registered contents of the applied term dictionary 52. FIG. 13 shows an example of the data format thereof. If a registered term of the applied term dictionary 52 has ambiguity or double meaning, a comment on term meaning is added in interface with a user of the dictionary means to ascertain the meaning.

A certain specification is given to a registered term of the applied term dictionary 52 on the document to determinably use the term as definition information to be construed in accordance with the registered meaning of the dictionary means, i.e., the usually understood meaning. After construing a term with this certain specification in accordance with the dictionary, the system also construes another piece of information specified on the document in association with a method determined depending on the construed meaning of the term to generate one piece of definition information for the system.

In the case of this example, the registered term "file name" of the applied term dictionary 52 specified to the "3. REGISTERED WORD" on the document defines that the corresponding data fields are file quote fields correlated with data files in accordance with the usually understood word meaning.

The specification to the "2. ITEM NAME" may be performed instead of the above "3. REGISTRATION WORD" if an agreement with a user is provided such that a data field is always defined as a file quote field if the term "FILE NAME" registered in the applied term dictionary 52 or a synonym thereof is entered at the above "specific adjacent position" or entered and correlated with a data field through the "linking line" as a heading of the data field. The specification to the "2. ITEM NAME" may be omitted under the above agreement.

Figure 14:
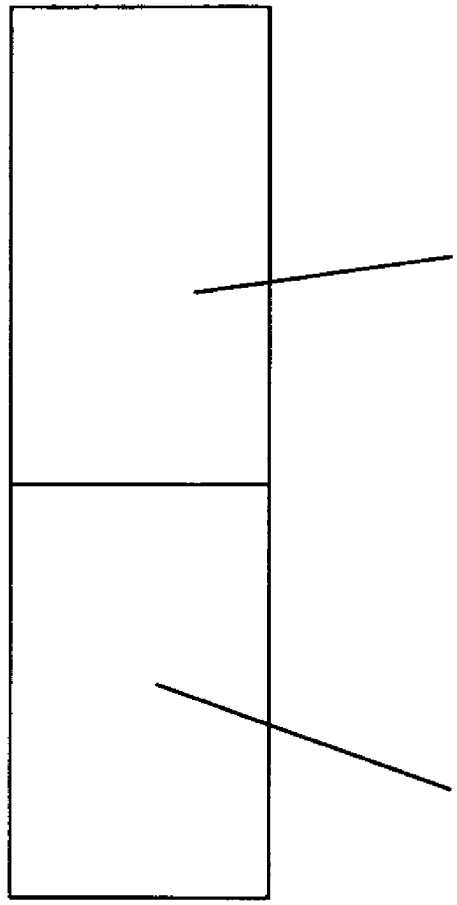
FIG. 14 depicts an example of a data format of specification target data in the system of the embodiment.

In response to the above specification operation, the system identifies the click specification target in accordance with the following process and then registers the click specification target to specification target data set as work data in the definition specifying unit 50. FIG. 14 shows a format of the specification target data. A corresponding code of the definition item category of the specification target is set in a "category" portion, and an address of the beginning cell data of the corresponding cell data chain described later is set in a "specification target data address" portion if the specification target is a cell column and an address of the corresponding character string data is set if the specification target is a character string.

The system determines whether the click-specified target is a character string or a cell column based on the click-button press-down information from the mouse 14 and repeatedly checks the movement track position information of the mouse pointer against the character string data position information of the characters or the cell data position information of the cells in the tabulation process application screen 33 to identify the click specification target. The position information of the characters in the character string may individually be calculated based on the beginning position information and the character pitch information in the corresponding character string data.

If the click specification target identified as above is a cell column, a cell data chain is created by sequentially linking cell data of the constituent cells with forward pointer information and backward pointer information thereof, and an address of the beginning cell data is set in the "specification target data address" portion of the "specification target data". If one data field forms a matrix of cells as in the case of the file quote fields of this example, a chain may be created for each line of the upper edge in the cell data chain and the last cell of each line may be linked to point the beginning cell of the next line.

If the click specification target identified as above is a character string, an address of the character string is set in the "specification target data address" portion of the "specification target table". If the click-specified character string is a partial character string of a character string having one piece of the character string data created, corresponding character string data may newly be created respectively for the click-specified partial character string and the remaining character string. The beginning positions of the character strings divided as above may be calculated based on the beginning position information and the character pitch information in the original character string data.

When the definition item category of the click specification target is determined as above, the system erases the special display (click display) of the click-specified portion and displays a symbol, a graphic, or a graphical feature preliminarily allocated to each specified definition item. For example, those defined in the definition element symbol table shown in FIG. 11 are displayed for the specific display allocated to the definition items.

If a user performs the above defining specification for all the item names and the data fields on the document and specifies an "execution" button 94 on the sub-screen 90, this causes the definition specifying unit 50 to find a corresponding item name for each data field to create and store "item definition data" correlating the both elements into the definition data storage unit 54 in the corresponding file information allocation area.

Figure 15:
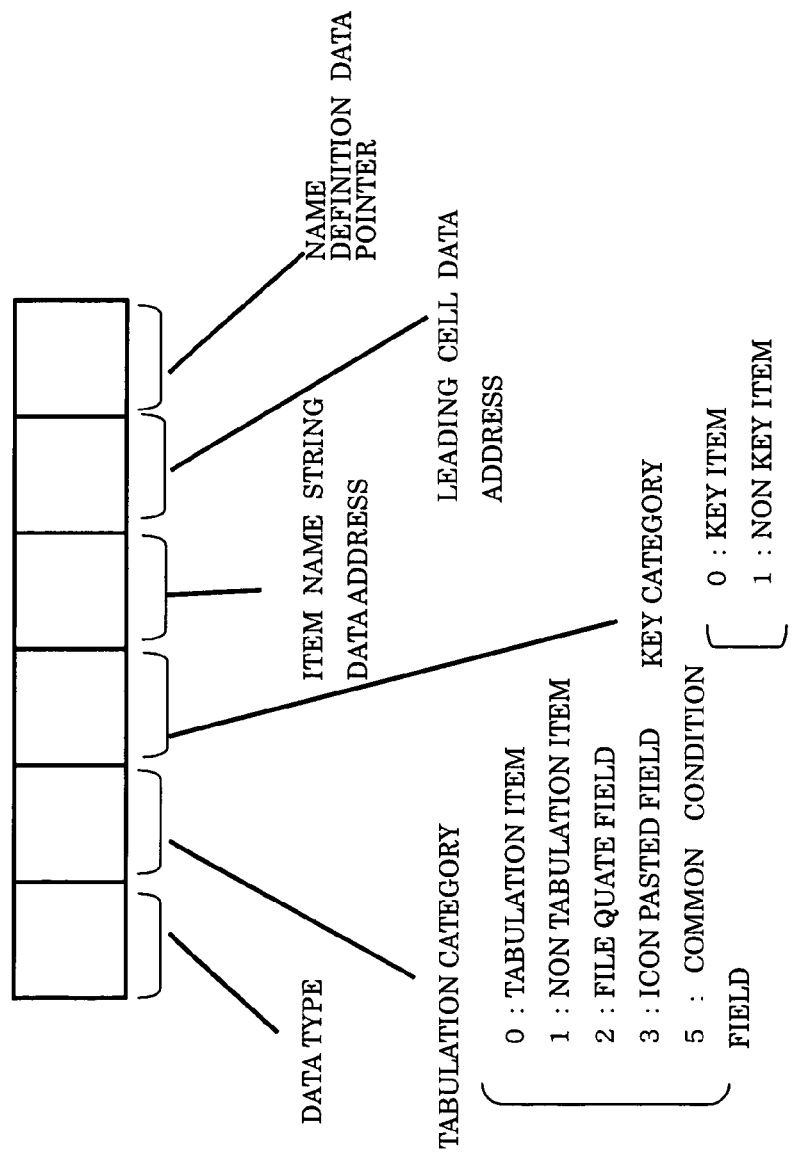
FIG. 15 depicts an example of a data format of item definition data in the system of the embodiment.

FIG. 15 shows a format of the item definition data. The character string data address of the corresponding item name character string is set in a "corresponding item name character string data address" portion, and the address of the beginning cell data of the cell data chain is set in a "beginning cell data address" portion. The character string data address and the beginning cell data address of the corresponding item name character string may be readout from the "specification target data address" portion of the "specification target table".

A combination of the data field and the corresponding item name may be identified in the following order. First, a combination of the item name character string and the data field linked by the above linking line is identified from the item names and the data fields registered in the specification target data.

It may be determined that the item name character string and the data field area registered in the specification target data are disposed at predetermined positions of the both ends of each line segment entered as the above definition entry information. This determination may be performed by repeatedly checking the position information of the both ends of the corresponding ruled line data against the character string data of the item name character strings registered in the specification target data or the cell data position information of the data field constituent cells registered in the specification target data. In this example, a combination of the item name character string "FILE NAME" and the data field thereof is selected at this step.

A combination of the data field located at the above "specific adjacent position" and the item name is then identified from the item name character strings and the data fields remaining in the specification target data. This may be performed by repeatedly checking the character string data of the item name character string against the cell data position information of the data field constituent cells.

If two or more data fields located at the "specific adjacent position" are identified for a certain item name character string, a data field without another item name character string entered at the adjacent position thereof is selected. In this example, a combination of the item name character string "BRANCH" and the data field thereof in the first column is selected at this step. The neighboring relationship of the item name character string and the data field may also be identified by repeatedly checking the character string data of the item name character string against the cell data position information of the data field constituent cells.

An adjacently entered combination is then selected from the item name character strings and data fields remaining in the specification target data. In this embodiment, a combination of the item name character string "YEAR" and the data field thereof in the first line is selected at this step. Lastly, if a combination of the remaining item name and the data field is uniquely defined, the combination is selected.

After identifying the combinations of the data fields and the corresponding item names to create the item definition data, it is determined whether the item name character strings specified to the above definition item category "3. REGISTERED WORD" is the "FILE NAME" registered in the applied term dictionary 52 or a synonym thereof. If this determination is positive, the corresponding data field is considered as a file quote field, and the corresponding code "2" is set in a "category" field of the item definition data.

It is also determined whether the item name character strings specified to the above definition item category "3. ITEM NAME" is given a definition element symbol representing an "aggregation item" of the definition element symbols, and the corresponding code "0" is set in the "category" field if this determination is positive or the code "1" representing a "non-aggregation item" is set if this determination is negative.

A function of defining the entire table as a file management table may be provided to simplify a portion of the above operation. If the entire table is defined as a file management table, when one data field is left without a corresponding item name identified, the data field is automatically defined as a file quote field and, therefore, the correlation with an item name may be omitted for the file quote field.

Figure 16:
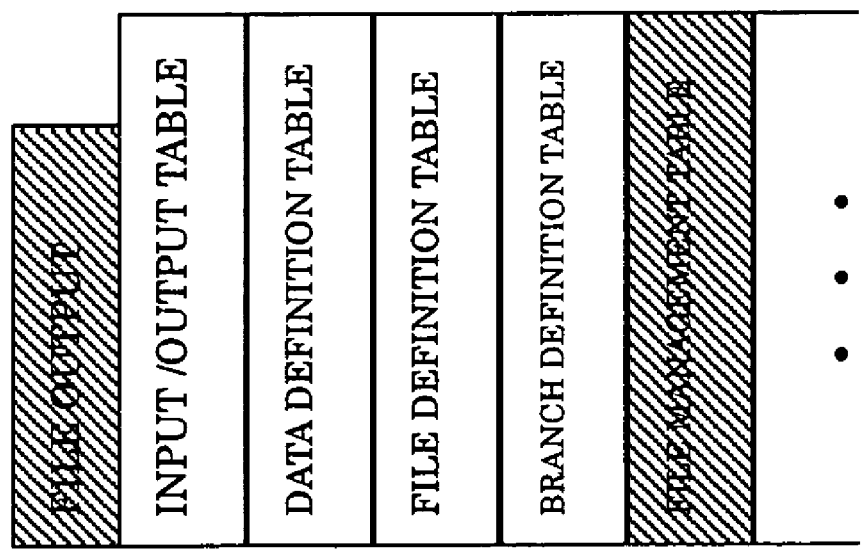
FIG. 16 depicts an example of a data format of a table type menu in the system of the embodiment.

A method of defining the entire table as a file management table may be performed by displaying a table type menu specifying a type of the table as shown in FIG. 16 on the tabulation process application screen 33 and selecting the "file management table" as a table type from the menu.

Alternatively, an agreement may be made with a user to assume that all the tables handled in this application are file management tables correlating data files with the file common condition parameters thereof.

A term representing the "file management table" may be registered in the applied term dictionary 52 and correlated with the entire file management table. For example, after confirming that the table title character string "file management table" of the table in this example is registered in the applied term dictionary 52, the specification to the definition item category "3. REGISTERED WORD" is performed.

Instead of using the sub-screen 90, the defining operation of the format definition may be performed with a method of directly adding a definition element symbol defined for each definition item such as "item name" and "data field" in the above definition element symbol table to a character string desired to be defined as an item name and a cell column desired to be defined as a data field with the use of a character input function and a line drawing function of the system. Differentiating modification information allocated to the definition entry information is added to the characters and symbols entered in this case.

The system first selectively reads the added definition element symbol with the use of the differentiating modification information allocated to the definition entry information and then identifies the definition items of the character string and the cell column with the definition element symbols added based on the type of the definition element symbol. Correlation between the item name and the data field is subsequently identified as in the above case to generate the item definition data.

Although a method of defining the format definition on the screen has been described as above, a user may be allowed to perform the definition by adding the respective relevant definition element symbols to a character string desired to be defined as an item name and a cell column desired to be defined as a data field on a table created on a paper sheet in the same way as above, and this paper sheet may be input to the system through the scanner 10. This addition is defined as the differentiating modification information determined for the definition and is given a (blue) color, for example.

When a user inputs this paper sheet into the system through a scanner 10, after recognizing character strings and ruled lines from the input image data, the system first selectively reads the definition element symbols with the use of the color information of the differentiating modification information and then identifies the corresponding definition items for the character string and the cell column with the definition element symbols added to generate the item definition data in the same way.

The following method is also available for a method of defining the format definition on the screen. After specifying one data field on the screen, when the definition field "1. FIELD" is specified on the sub-screen 90 or the left button of the mouse 14 is double-clicked while the mouse pointer points at the corresponding data field, an item name specification screen of FIG. 17A is subsequently displayed. A mode is provided for displaying the item name specification screen when the left button of the mouse 14 is double-clicked after the mouse pointer is positioned at a place other than the character string portion within a cell in the click specification operation of the mouse 14.

The item name specification screen is provided with an item name entry field 101, a registered item name entry field 103, a data name entry field 105, and a field format entry field 107. When an end button 109 on the item name specification screen is clicked after an item name desired to be correlated with the currently click-specified data field area is entered into the item name entry field 101 or the registered item name entry field 103, the item definition data with the input item name set are created for the corresponding data field. The above operation may be repeated for all the data fields making up the table.

The item name may be entered into the item name entry field 101 or the registered item name entry field 103 in the following method to simplify the operation. After the mouse cursor is brought to the item name entry field 101 or the registered item name entry field 103 and the left button of the mouse 14 is clicked to shift to the corresponding field input mode, if the left button is clicked again, an item name candidate menu is displayed. For example, FIG. 17B shows an item name candidate menu 111 displayed when the registered item name entry field 103 is double-clicked.

The system preliminarily registers terms generally used as item names into the specific dictionary means and lists and displays the specific terms on the item name candidate menu. The registered words of the "item name" category in the applied term dictionary 52 are listed on the item name candidate menu 111 displayed when the registered item name entry field 103 is double-clicked.

If a desired item name is clicked and specified on the displayed item name menu, the clicked item name is entered into the item name entry field 101 or the registered item name entry field 103.

The file management table with a format defined as above is displayed with symbols given for representing definitions as shown in FIG. 18(a). A user may open a desired data file from the format-defined file management table to refer to the contents thereof. When the left button of the mouse 14 is clicked with the mouse pointer specifying one file name character string entered in a file quote field on the format-defined file management table, the corresponding data file is opened and a window screen displaying the contents is displayed on the display screen 20a.

When the mouse pointer is positioned at a place within the tabulation process application screen 33 and the click operation of the left button of the mouse 14 is accepted, the tabulation process application program first determines whether the click position is within a data field defined as the file quote field, and if the click position is outside of a data field of the file quote field, a cell including the click position is indicated as in the above normal response, and if the click position is within a data field of the file quote field, the following special response is made.

That is, the tabulation process application program detects a character string including the click position, converts the file identification name into the system access name as above, accesses to the file data storage unit 40 to fetch all the contents of the corresponding data file onto a predetermined area of the internal memory 16, and displays the contents on the display screen 20a.

After the mouse pointer is positioned in the corresponding data file name character string, the right button of the mouse 14 may be clicked to click and specify a "file open" button for specifying the corresponding process from a function menu (not shown) subsequently displayed in the data file open operation. In this way, a user may manage a group of data files having a common data configuration on the file management table clearly correlating the file names with the common condition parameters.

The format-defined file management table may temporarily be saved by clicking the "save" button always displayed on the tabulation process application screen 33. If a saved name is input of a save operation guide screen (not shown) subsequently displayed and an "execution" button is specified on the save operation guide screen, the corresponding tabulation process application screen 33 disappears from the display screen 20a and the corresponding file management table itself is converted into an icon and displayed at a suitable position on the screen instead.

The file output function of the system will then be described. The file output function may be performed continuously from the defining operation described above or may be performed when the file management table once saved in the external memory 18 is opened again after the defining operation is once performed.

Figure 19:
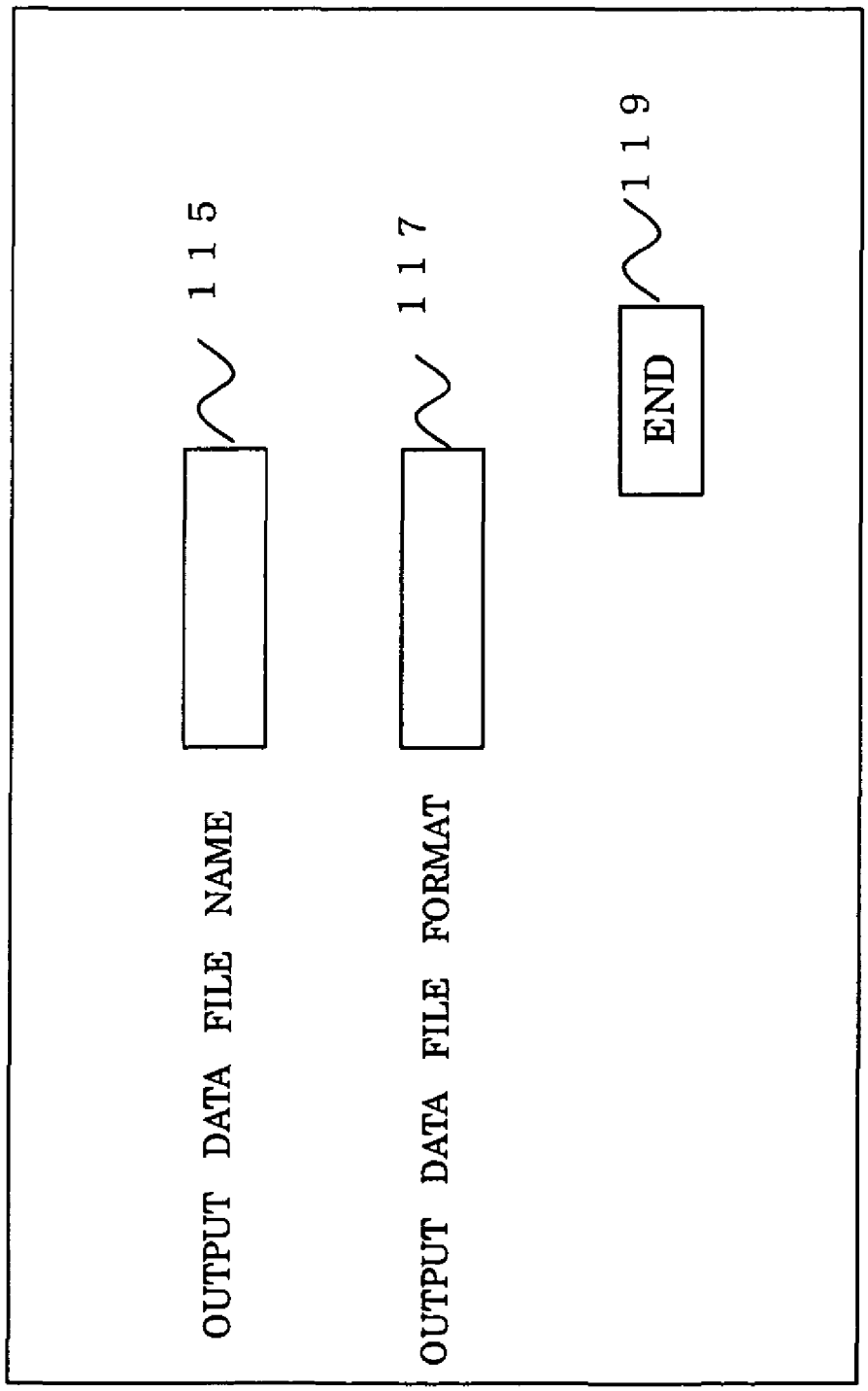
FIG. 19 depicts a file output menu in the system of the embodiment.

It is assumed that the format-defined table of FIG. 18(a) is displayed on the screen. When a user specifies a "file output button" always displayed on the tabulation process application screen 33, a file output menu of FIG. 19 is displayed, for example. If a user inputs and selects a name of an intended merge data file, a file format, etc., in an output data file name input field 115 and a file format input field 117 in a file output file menu and specifies an "execution" button 119, the system starts the file output process.

The output data file name and the file format input in the file output file menu are registered as "output data file name data" and "output file format data", respectively, in a certain area of the internal memory 16. In the case of this example, for example, it is assumed that an intended merge data file name "AGGREGATION 01-03" is input and that the CSV format is selected as the file format.

The data output function of the system is implemented by the following actions of the constituent units shown in FIG. 4. The table record extracting unit 60 refers to the item definition data and the cell data stored in the definition data storage unit 54 and the character string data stored in the document data storage unit 39, extracts associated data, i.e., a combination of data to be referred on the table format concurrently with one cell or data in the file quote fields based on the arrangement rule of the data on the table, and identifies the data as a table record in accordance with the corresponding file quote field cell.

The file-to-be-merged fetching unit 42 fetches and stores into the file-to-be-merged storage unit 46 the corresponding data file from the file data storage unit 40 based on the file identification name entered in the file quote field cell in the table record The data merging portion 62 creates and stores into the merge file storage unit 48 a merge data file obtained by merging the data file to be merged set in the file-to-be-merged storage unit 46 with the above associated data among the data making up the table record fetched by the table record extracting unit 60.

In this description, data to be referred at the same time or a combination of cells storing the data in one table format are particularly referred to as a table record while a record making up a data file is differentiated from the "table record" and referred to as a "file record". A file quote field cell and the associated data thereof make up one table record. The associated data of the file quote field cell may be read as data located on the same line or the same column as the corresponding file quote field cell on the table and having a different item name from the file quote field of the table based on the arrangement rule of the data on the table.

Figure 20:
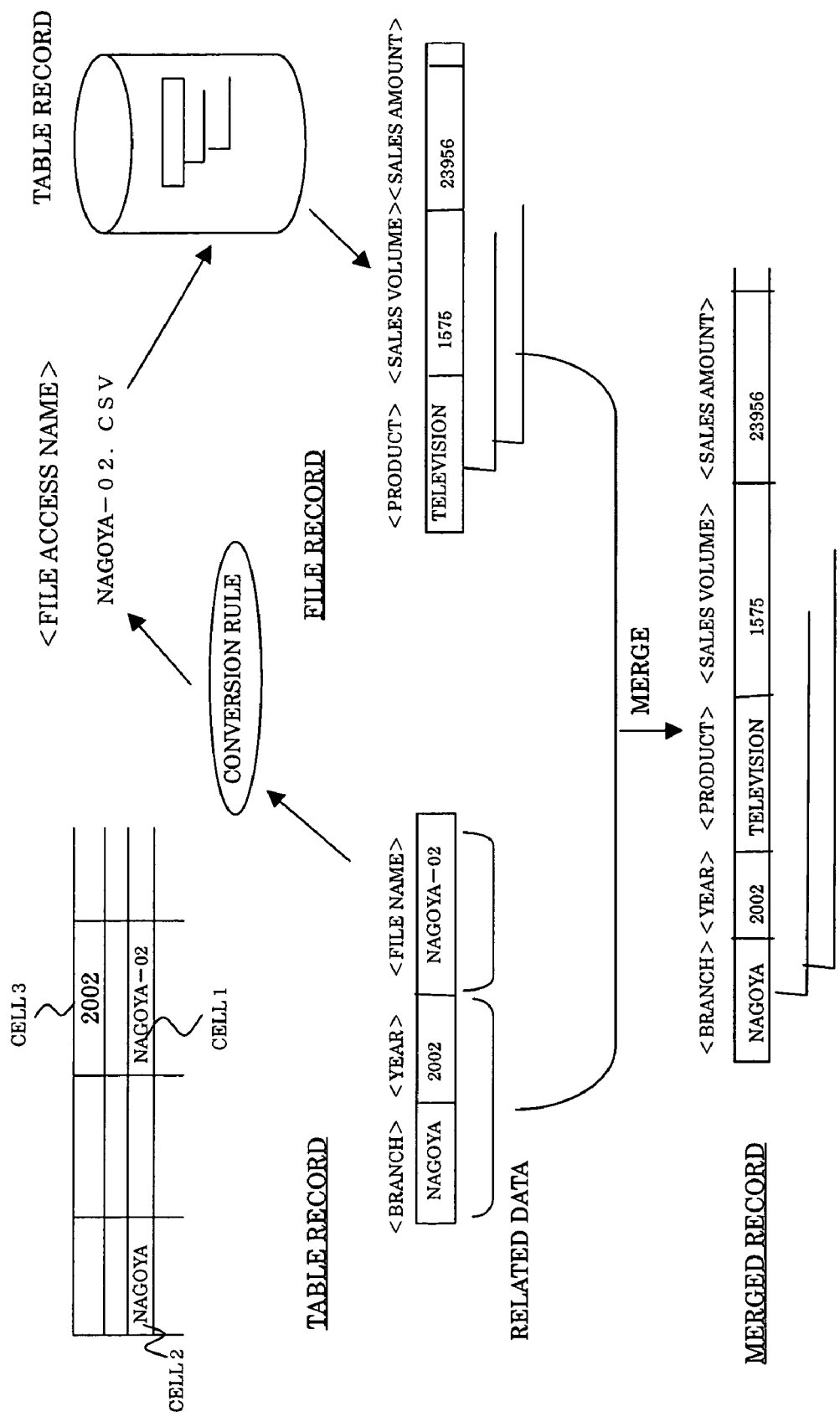
FIG. 20 is a block diagram of an image of a related data merge process in the system of the embodiment.

Describing the above file output function with reference to this example, for example, in FIG. 20, the associated data of a cell 1 in the file quote field are identified as data "NAGOYA" of the item name "BRANCH" entered in a cell 2 of the same line and data "YEAR 2002" of the item name "YEAR" entered in a cell 3 of the same column. A combination of data in the cell 1, the cell 2, and the cell 3 make up the above table record.

On the other hand, a corresponding data file is fetched based on a file name "NAGOYA-YEAR 2002" entered in the cell 1, and a merge data file consisting of the item names "YEAR", "BRANCH", "PRODUCT", "SALES VOLUME", "SALES AMOUNT", "CATEGORY", AND "MONTHLY" is created by merging data of the item names "YEAR" and "BRANCH" excluding the cell 1 in the file quote field on the identified table record as the associated data with all the constituent file records consisting of the item names "PRODUCT", "SALES VOLUME", "SALES AMOUNT", "CATEGORY", AND "MONTHLY".

Details of the "file output process" of the system will be described with reference to a procedure shown in FIG. 21. In an initial process (step G1), a merge work table is created with a configuration of FIG. 22. The table record read for one file quote field cell and the file record fetched from the corresponding data file are set in this merge work table to create a merge record merging the both records.

The constituent item names of the table record fetched from the file management table and the constituent item names of the file record quoted on the file management table are entered into item name entry fields of the first line of the merge work table. In the case of this example, "BRANCH", "YEAR", AND "FILE NAME" are entered as the constituent item names of the table record fetched from the file management table, and "PRODUCT", "SALES VOLUME", and "SALES AMOUNT" are entered as the constituent item names of the corresponding file record.

A "category" of the item name is entered into a category entry field of the second line of the merge work table. A corresponding code (e.g., code "2") is entered in the field corresponding to the item name "FILE NAME" to indicate that this is the item name of the file quote field. A corresponding code (e.g., code "1") is entered in the field of the table record constituent item name, and a corresponding code (e.g., code "0") is entered in the field of the file record constituent item name.

The cell data addresses of cells making up the table record read from the table are set in the fields corresponding to the table record constituent item names (fields of the same column as the corresponding item names) among the output source data address entry fields of the third line of the merge work table.

Recode offset position specification values of the data file constituent item names are set in the fields corresponding to the file record constituent item names among the output source data address entry fields. If the file format is the CSV format as in this example, the order of storage of the corresponding item name in the record is entered as the recode offset position specification value of the data file constituent item name.

The data in the table record constituent cells set in the output source data address entry fields of the third line are respectively set in the fields corresponding to the table record constituent item names among the output source data address entry fields of the fourth line of the merge work table. That is, the file identification names entered in the file quote fields of the table and the associated data are set. The data of the items in the records fetched from the corresponding data files are set in the fields corresponding to the file record constituent item names among the output source data entry fields.

For example, the merge work table may be implemented as follows. List data are provided for each data entry field on an aggregation management table, and the list data have stored thereon data in the data entry fields as well as line-direction point data and column direction point data such that the data in the adjacent data entry fields may sequentially be tracked in the line direction and the column direction.

In the initial process (step G1), after the merge work table is set as above, the constituent item names of the table record and the constituent item names of the file record are set in the item name entry fields (first line) of the merge work table. The corresponding category codes are set in the respective category entry fields (second line) as above.

The constituent item names of the table record may be identified from the character string data pointed by the "corresponding item name character string address" portions of the item name definition data stored in the definition data storage unit 54. The constituent item names of the corresponding file records may be read by opening a data file correlated with the file management table and reading an item name index portion thereof in accordance with a method determined for each file format.

The data file correlated with the file management table may have file common condition parameters already included in the record data as the specification of the tabulation process application. Therefore, the file record constituent item names same as the constituent item name of the table record are not redundantly set in the item name entry fields (first line). The corresponding codes of the table record constituent items are set in the category entry fields (second line) corresponding to the overlapping item names.

All the data files correlated with the file management table are opened to confirm that remaining combinations excluding the table record constituent item names are the same in all the data files among the combinations of the file record constituent item names. If a file has a combination of the constituent item names different from other files, a suitable abnormal message is displayed on the corresponding tabulation process application screen.

With regard to the entry order of the item names in the item name entry fields of the merge work table, the table record constituent item names are set at positions before the file record constituent item names by default. The table record constituent item names may be entered in random order. The entry order of the constituent item names of the file record are set in accordance with the registration order in the item name index portion of the corresponding data file by default.

In the initial process (step G1), the file-to-be-merged storage unit 46 having the data file to be merged stored thereon and the merge file storage unit 48 having the merge data file stored thereon are set in respective suitable positions on the internal memory 16. A managing unit of the merge data file is created at a predetermined position in the merge file storage unit 48 in accordance with the specified output file type format. The specified output file type format may be read from the "output file format data" set in a certain area of the internal memory 16.

The names input in the file output menu and registered in the "merge data file name data" may be set in the name portion of the merge data file managing unit. The text data set in the "item name entry field" of the first line of the merge work table may be set the item name index portion of the managing unit of the merge data file, excluding the item name corresponding to the file quote field in accordance with a format determined for each output file type.

If the specified output format is the CSV format as in this example, a group of the text data set in the "item name entry field" of the first line of the merge work table excluding the item name "FILE NAME" may be linked as a continuous text string in the record configuration order (the order of setting on the merge work table) and delimiter symbols "," may be inserted with a new-line symbol added at the end of the text string for the item name management index portion.

when a start position is set to a position of fetching the table records on the file management table at the end of the initial setting process of step G1, the system then identifies one table record from the file management table in the action of the table record extracting unit 60 and sets the cell data addresses and the entry data of the constituent cells into the corresponding fields of the output source data address entry fields on the third line and the output source data entry fields of the fourth line, respectively, of the merge work table (step G2).

The associated data making up the table record in combination with one cell in the file quote field on the table may be read as data located on the left side of the same line or the upper side of the same column and having an item name different from the file quote field of the table as described above. The data may sequentially be tracked through the cell data chain pointed from the item definition data defined for the data fields located on the left side or the upper side of the corresponding file quote field and may be identified as data in the cell in the above arrangement relationship.

In the case of table including the file quote field as in this example, for example, cells may be fetched one-by-one from the cell at the start position of the file quote field, and the table records including the fetched cells may be identified from the table format. With regard to the order of fetching the cells from the file quote field, for example, the cell at the upper left corner of the file quote field may be defined as the cell at the start position of the fetching; the cells may sequentially be fetched from the left side in the same line; and the same operation may be repeated in the next lower line after all the cells are fetched in one line.

The system then fetches onto the file-to-be-merged storage unit 46 the corresponding file data for the file quote field cell in the table record currently fetched on the merge work table in the action of the file-to-be-merged fetching unit (step G3).

First, a conversion is made in the merge work table from the corresponding data file name set in the output source data entry field of the fourth line on the column having the corresponding code of the "file quote field" set in the category entry field of the second field into a file management name accessible to the file data storage unit 40, and this access name is used to fetch the entire corresponding data file from the file data storage unit 40 of the external memory 18 into the data-file-to-be-merged storage unit 46 preliminarily set in the internal memory 16.

In the file quote fields of the file management table, identification names for a user are entered as file management names of corresponding data files of the environment control program, excluding the file type specification part ".csv" as described above. The corresponding file management name may be acquired by executing the forward matching retrieval of the corresponding file quote field entry name for all the file management names defined in the system. In the case of this example, a file management name "YEAR 2002-NAGOYA.csv" is retrieved from a file quote field entry name "YEAR 2002-NAGOYA", for example.

It is then determined for the data file to be merged fetched into the data-file-to-be-merged storage unit 46 whether the file common condition data currently fetched into the table record are already included in the constituent record thereof (step G4). This may be performed by finding the item name having the corresponding code "1" of the "table record constituent element" set in the "category entry field" on the merge work table and by searching that the item name is registered in the item name index portion of the corresponding data file.

If the determination of step G4 is negative, the associated data in the corresponding table record are merged with the data file to be merged fetched into the data-file-to-be-merged storage unit 46 to create a merge data file (step G5). If the determination of step G4 is positive, the subsequent procedure from step G5 of merging the associated data read from the file management table is skipped to return to step G2 for reading the next table record from the file management table.

At step G5, first, in the initial setting process, the record addresses of the record constituent data registered in the item name index portion of the corresponding data file are set in the corresponding fields of the output source data address entry fields of the third line of the merge work table. In the case of this example, since the "file format" is the CSV format, the order of storage of the record constituent data in the record is set.

After the constituent records are subsequently and sequentially fetched from the corresponding data file set in the data-file-to-be-merged storage unit 46, the constituent data of the corresponding records are set into the corresponding field of the output source data portion of the fourth line of the merge work table based on the record addresses set in the corresponding fields of the third line of the merge work table.

Each merge record making up the target merge data file may be acquired by excluding data of the item name "FILE NAME" from a data group set in the output source data portion of the fourth line of the merge work table. The acquired merge records are converted into a specified output format and stored into the merge file storage unit 48.

Since the specified output format is the CSV format in the case of this example, the merge records are converted in to a format of text strings acquired by linking each piece of text data making up the merge record in the record configuration order (the order on the merge work table) and by inserting the delimiter symbols "," between respective pieces of the data.

When a merge record is created as above for one file record fetched from the corresponding data file to be merged, a process is repeated to fetch the next file record from the data file to be merged and to create and store a merge record into the merge file storage unit 48. The order of storage of the merge records into the merge file storage unit 48 is the order of storage of the corresponding records in the data file to be merged by default.

In the case of the CSV file of this example, the text string of the merge record created first may be linked to the end of the text string of the above item name index portion after adding a new-line symbol. The second or later text strings of the merge record may be linked to the end of the previously created and stored text string of the merge record after adding a new-line symbol.

When step G5 is terminated by creating and adding the merge records to the merge data file for all the file records fetched from the corresponding data file to be merged, the fetching position of the next table record is searched (step G6) and it is determined whether the next table record can be fetched (step G7).

If the above determination is positive, the procedure returns to step G2 for identifying the next table record from the file management table, and process of steps G3 to G6 is subsequently repeated for fetching the new data file to be merged fetched based on this process and merging and adding the corresponding associated data to the merge data file. The process procedure of step G2 to G6 is repeated for all the table records fetched from the file management table.

Above step G7 is executed as a process of detecting the end of the cell data chain created in the file quote field in this example. If it is determined that the next table record is not extracted at step G7, an end process such as providing an end code on the merge data file is executed (step G8) and this procedure is terminated.

A group of merge records created for the data file to be merged fetched from one table record (file quote field cell) is stored at a position following a group of merge records created for the previously fetched data file to be merged by default.

In the case of the CSV files of this example, the first created text string of the merge record from the data file to be merged fetched for the second time or later from the file management table may be linked to the end of the last merge record text string stored for the data file to be merged fetched from the file management table at the previous time after adding a new-line symbol.

After the corresponding associated data are merged and stored in the merge file storage unit 48 for all the data files to be merged, a file creation end process determined for each corresponding file type may be executed at step G8 to acquire the intended merge file.

The file management table may have "common condition data" entered on the outside of the table as shown in FIG. 23. In FIG. 23, data "DOMESTIC" of an item name "DESTINATION" entered outside of the table are the "common condition data" for all the file quote fields on the table, which are the above associated data.

The defining operation for the file management table of FIG. 23*may* be performed by correlating the character string "DESTINATION" with the data name character string "DOMESTIC" in accordance with the above method. For example, after clicking and specifying the character strings "DESTINATION" and "DOMESTIC" on the display screen a, the "2. ITEM NAME" and the "3. DATA NAME" may respectively be specified on the sub-screen 90.

When creating the definition data, the "DESTINATION" specified for the item name character string adjacent to the left side is identified as an item name corresponding to the "DOMESTIC" specified for the data name character string in accordance with the criteria of correlating the item names with the data fields to create the item definition data. The address of the character string data of the corresponding item name character string is set in a "corresponding item name character string data pointer" portion of the corresponding item definition data, and the address of the character string data of the corresponding data name character string is set in a "beginning cell data pointer" portion.

When handling the file management table having the "common condition" outside of the table as the associated data, the data defined as the "common condition data" are distinguished from data read within the same table as the file quote field in accordance with the arrangement rule of the data on the table (hereinafter, "table associated data") at the time of creating the definition data among the associated data of the file quote field cell as follows.

That is, cells adjacent to the upper side of all the cells in the uppermost line of the file quote field are sequentially tracked to identify the item definition data field that each tracked cell belongs to. The item definition data fields identifiable with the above method for all the cells in the uppermost line are first determined as the item definition data fields of the "table associated data". Cells adjacent to the left side of all the cells in the leftmost column of the file quote field are also sequentially tracked to identify the item definition data field of the "table associated data".

The data defined as the "common condition" are identified as data not determined as the "table associated data" in the above determination procedure among all the pieces of data defined with item names on the file management table, and a corresponding code (e.g., "5") indicating the "common condition" is set in the "category" of the corresponding item definition data.

At step G1 of the output process, an item name defined as the "common condition" is added to the "item name entry field" of the first line of the merge work table, and the corresponding code (e.g., "5") indicating the "common condition" is set in the corresponding "category entry field" of the second line.

In the process at step G2 of reading table records from the table, the data set at the time of the first table record reading may continuously be set at the time of the subsequent table record reading for the item having the corresponding code indicating the "common condition" set in the "category entry field" of the second line of the merge work table.

At step G5, the fixed "common condition data" are respectively merged with data of the corresponding data file in addition to the associated data read from the table for all the file quote field cells. In the case of this example, the common data "DOMESTIC" of the item name "DESTINATION" are respectively merged with all the data files having the identification names entered into the file quote field in addition to the corresponding data of the corresponding item names "YEAR" and "BRANCH".

A data file such as a CSV file is managed as one file by the environment control program in a known method in the embodiment system; the file is represented by an icon displayed on the desktop screen; and if the icon is specified in a certain way on the display screen 20a, one window screen is generated on the display screen 20a to display contents of the corresponding file.

A method of managing data files with the file management table may be a method of pasting icons representing the data files onto the corresponding file quote field cells instead of the method of entering file names into the file quote field cells of the file management table as in the above example.

It is assumed that the environment control program generates icon definition information for the corresponding data files in the system and that the icons are displayed on the desktop screen based on this information. The icon definition information is made up of ID (pointer) information, icon display position information on the display screen 20a or the desktop screen, pointer information for the corresponding main file information or the corresponding window screen, pointer information for image data representing the icon image, etc., in a known method.

A user brings this icon into the tabulation process application screen 33 displaying the corresponding file management table to execute the drag and drop operation at the target position. The timing of pasting the icon onto the file management table may be before or after the above format definition operation is performed for the file management table.

In response to the drag and drop operation of the icon, the environment control program redisplays the icon image at the position of the drag and drop operation on the desktop screen in a known method and determines whether the corresponding icon is included on the window screen of the application program displayed on the desktop screen to notify the corresponding application program if this determination is positive.

If the tabulation process application screen 33 is currently displayed on the desktop screen and the corresponding icon is dragged and dropped onto the tabulation process application screen 33, the corresponding tabulation process application program is notified by the above environment control program, calculates the icon pasted position on an icon paste target document (document with the file management table entered), and registers the position as "document icon position information" into the corresponding file information such that the information is linked with "icon pointer information" indicating the corresponding icon definition information.

This "document icon position information" may be obtained by subtracting from the position of the corresponding icon on the desktop screen both a relative position of the corresponding tabulation process application screen 33 on the desktop screen and a relative position of the corresponding icon paste target document on the corresponding tabulation process application screen 33.

Figure 21:
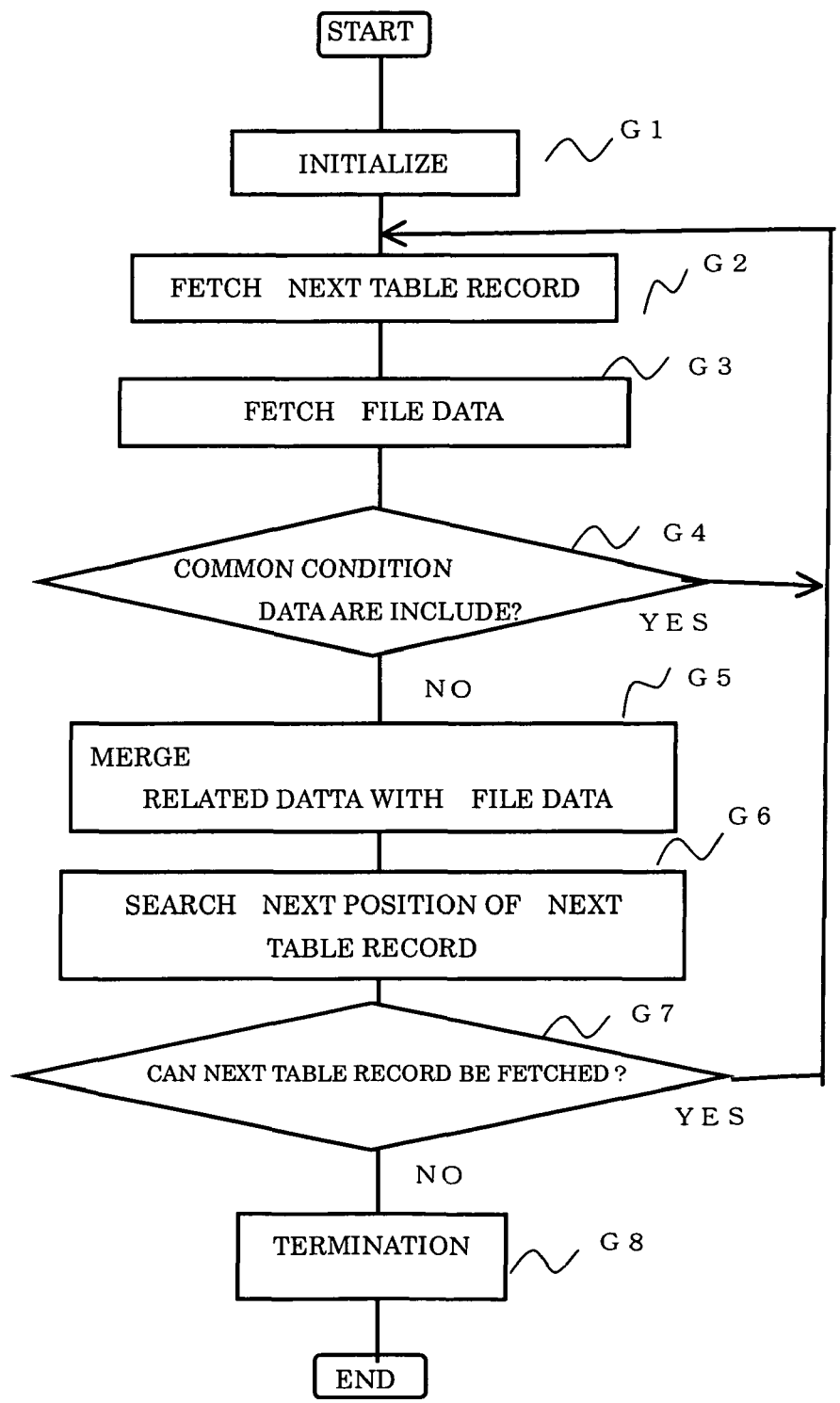
FIG. 21 depicts an overall procedure of a file output process in the system of the embodiment.

When receiving the user's instruction for the "file output", the system first performs the procedure shown in FIG. 21. However, it is determined whether an icon is pasted in the corresponding file quote field cell at step G2 of detecting the table records from the file management table.

The icons pasted in cells of the file quote field may be detected by repeatedly checking the positions of the corresponding file quote field cells on the document against the positions of the icons on the document. The positions of the file quote field cells on the document may be known from the corresponding cell data, and addresses of the corresponding cell data are set in the "output source data address entry field" of the third line of the merge work table. The positions of icons on the document pasted in the corresponding tabulation process application screen are registered as the "document icon position information" generated in the corresponding file information of the tabulation process application such that the information is linked with the "icon pointer information" for the corresponding icons as above.

At step G2, if it is determined that an icon is pasted in the corresponding file quote field cell as in this example, a specific code ("3") is set in the corresponding field of the "category entry field" of the second line of the merge work table to indicate that the set data in the corresponding fourth-line output source data entry field are the icon pointer information, and if it is determined that a character string is entered in the corresponding file quote field cell, the corresponding code ("2") is set again. If it is determined that an icon is pasted in the corresponding file quote field cell, the corresponding "icon pointer information" is set in the corresponding field of the output source data entry field of the fourth line of the merge work table.

At subsequent step G3, first, if the specific code is set in the "category entry field" of the second line of the merge work table to indicate that the set data in the "output source data entry field" of the fourth line of the merge work table are the pointer information for the icon definition information, the icon definition information may be identified with the "icon pointer information" set in the corresponding field of the "output source data entry field" of the fourth line of the merge work table, and the actual data file pointed by the corresponding icon definition information may be opened on the file-to-be-merged storage unit 46. The subsequent process is performed in exactly the same way as the above case.

One function of the tabulation process application program according to the present invention may cause the system to execute a process of immediately merging the associated data read from the icon paste position of the file management table with a corresponding data file in response to the operation of pasting an icon representing the data file onto the format-defined file management table.

That is, if a user drags and drops an icon representing a data file into one cell of the file quote field of the format-defined file management table shown in FIG. 18(a) (See FIG. 18(b)), the tabulation process application program receives a notification from the environment control program as above, generates "document icon position information" that is the position of the corresponding icon on the corresponding application document such that the information is linked with the "icon pointer information" indicating the corresponding icon, and determines whether the dragged and dropped position of the icon is within the data field defined as the file quote field. This determination is made by repeatedly checking the application document position information of the corresponding icon against the cell data position information created for each corresponding cell in the table.

If this determination is positive, the system displays a confirmation screen of FIG. 24 on the display screen 20a for instructions from a user. The confirmation screen of FIG. 24 arranges and displays buttons representing constituent item names of the corresponding table record and constituent item names of a file record in accordance with the above default order. The user may rearrange the buttons representing the item names through the drag operation with the mouse 14 to change the data configuration of the merge record into the desired order on this screen.

If the user clicks and specifies an "execution" button 121 on the confirmation screen of FIG. 24, the system identifies the above associated data from the table for the cell with the icon pasted and merges the data with the constituent records of the corresponding data file. That is, steps G1, G2, G3, G4, G5, and G8 may be performed which are performed for one file quoted field cell in the procedure of FIG. 21. However, the item names in the item name entry fields of the first line of the merge work table are rearranged at step G1 in the order rearranged by the user on the confirmation screen.

The system then moves the newly merged data file from the merge file storage unit 48 to a suitable position in the file data storage unit, changes the point destination of the point information for the actual data file included in the corresponding icon definition information to this newly merged data file, and discards the original actual data file.

The defining of the item definition for the file quote field may be omitted in the function of executing the merging of the associated data on the file management table in accordance with the pasting of the corresponding icon onto the corresponding table. That is, with regard to data within the same table as the cell with the icon dragged and dropped having the item name defined, when it is assumed in an agreement with a user that the data must be the associated data of the corresponding cell if the data are entered on the upper side or the left side of the cell with the icon dragged and dropped, if the system detects that the icon is dragged and dropped in the tabulation process application screen 33, the system determines whether the dragged and dropped position is within the cell having the cell data created and whether the associated data satisfying the above arrangement condition are detected from the same table.

This determination may be made by sequentially obtaining cells adjacent to the upper side or the left side of the cell position where the icon is dragged and dropped and by determining whether the cells are included in the data field having the item name defined. If this determination is positive, the identified associated data may be merged with the corresponding data file in accordance with the above method.

Since the vertical dimensions of icons displayed on the desktop screen are generally greater than the vertical dimensions of cells for entering characters, when an icon is dragged and dropped into one cell, the dimension of the cell may automatically be adjusted in accordance with the dimension of the icon.

After a vertical dimension of a new cell is determined by adding suitable upper and lower margin dimensions to the vertical dimension of the icon, the upper edge of the file quote field is used as a reference to update the vertical position information to new positions for the ruled line data of the horizontal ruled lines drawn lower than the upper edge. The corresponding ruled line data may be arranged in the order of the vertical arrangement and the vertical position information may sequentially be updated in accordance with the vertical dimension of the new cell. Subsequently, after the lower end position information is updated for the ruled line data of the vertical ruled lines making up the table based on the vertical position of the lowermost horizontal ruled line of the horizontal ruled lines having the ruled line data updated, new cell data are generated based on the ruled line data updated as above on the lower side of the upper edge of the file quote field, and the original cell data are discarded.

The system may automatically generate a name of a pasted data file in accordance with the operation of pasting the icon of the data file onto the file management table. In general, when a user manages a group of a plurality of data files having the same data configuration as in the above example, the most identifiable names for respective data files are those having the common condition parameters of the data files clearly indicated in the names. Therefore, the common condition data of the corresponding data file may be read from the file management table as the associated data for the icon pasted cell on the file management table as above, and the read common condition data character string may be applied in accordance with a suitable generation rule to create a character/symbol string.

Figure 25:
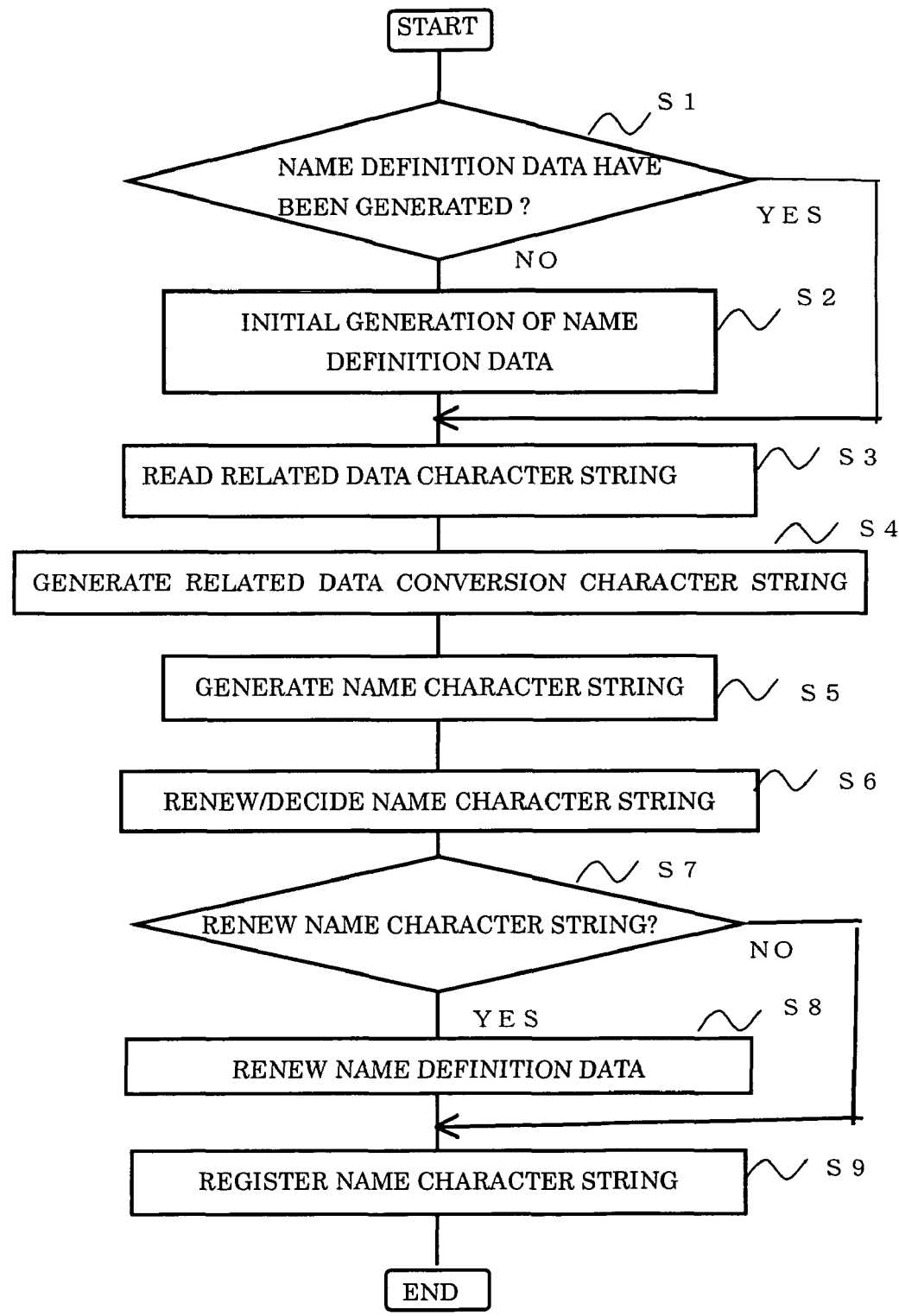
FIG. 25 depicts an overall procedure of a file naming process in the system of the embodiment.

When a user pastes an icon representing a file into a cell of the file quote field on the above format-defined file management table, the tabulation process application program receives a notification from the environment control program as above, generates the "document icon position information" that is the position of the corresponding icon on the corresponding application document as above, and determines whether the icon paste position is within the data field defined as the file quote field, and if this determination is positive, a procedure shown in FIG. 25 is executed.

It is first determined in this procedure whether name definition data described later are already created for the file quote field with the icon pasted (step S1). This determination is made by referring to a "name definition data pointer" portion of the item definition data defined for the corresponding file quote field. If the name definition data are created, the address thereof is set in the "name definition data pointer" portion, and if the name definition data are not created, certain data are set to indicate that the name definition data are not created.

If the name definition data are not created in the determination at above step S1, the name definition data are initially created as follows and are pointed by the "name definition data pointer" portion in the corresponding item definition data created for the data field of the file quote field (step S2).

Figure 26:
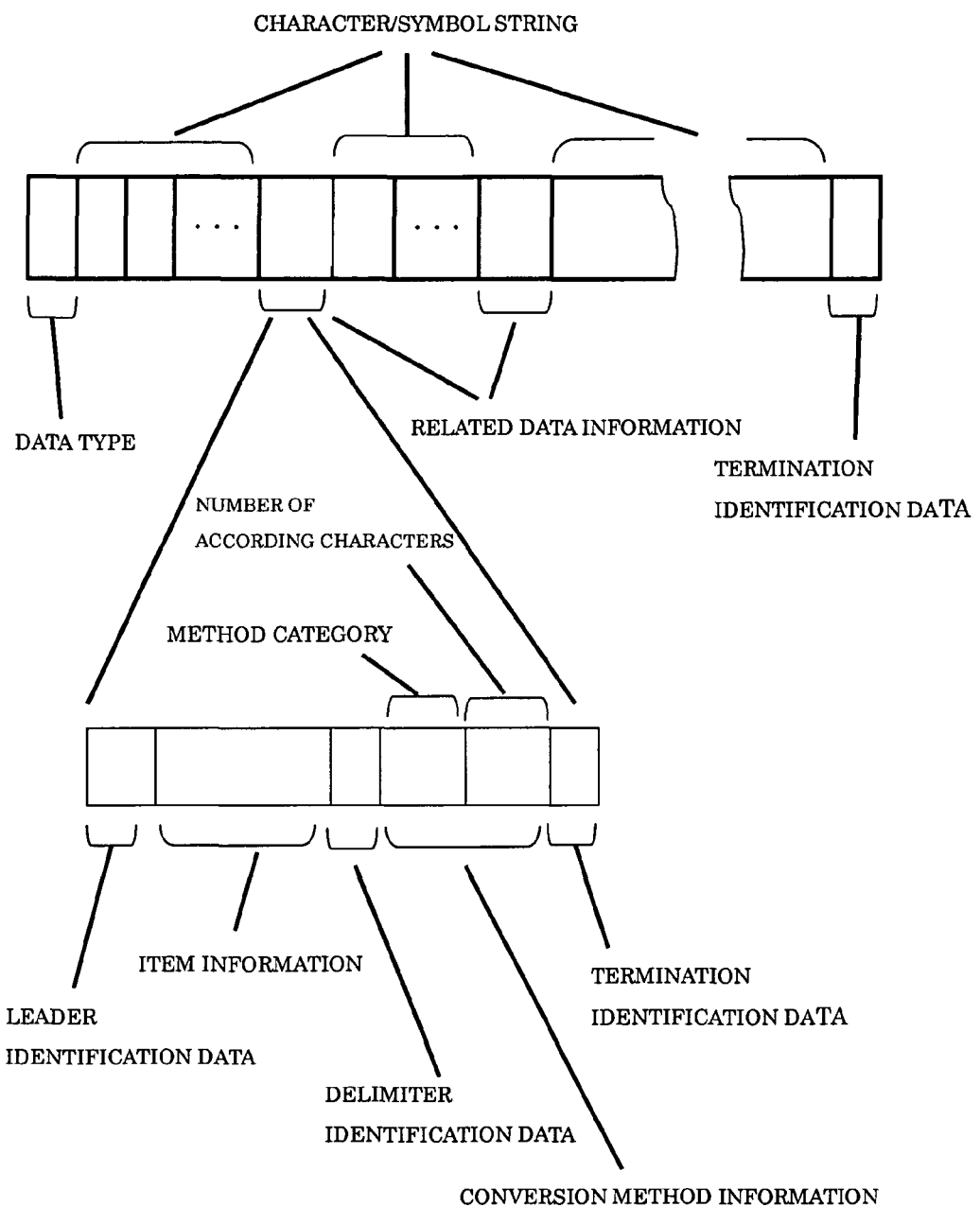
FIG. 26 depicts an example of a data format of name definition data in the system of the embodiment.

The name definition data have a format with "associated data information" created for each piece of the associated data of the file quote field inserted into an arbitrary position in arbitrary character/symbol string data as a general format as shown in FIG. 26. The "associated data information" includes "item name information" representing the corresponding item names of the associated data and "conversion method information" described later.

When this name definition data are initially created, after the item names of the associated data of the file quote field are identified on the file management table, the "associated data information" is created for each identified item name, and each piece of the "associated data information" is linked with a predetermined suitable delimiter symbol in a suitably defined order to create the name definition data in the simplest form, for example.

For the item names of the associated data of the file quote field, a reference may be made to the corresponding character string data based on the "corresponding item name character string data address" in the item definition data defined for the data fields other than the file quote field on the file management table. The text string of the corresponding item name is set in the "item name information" in the "associated data information", and the code representing "non-conversion" is set in the "conversion method information" as an initial setting value.

All the associated data character strings are read for the corresponding cell with the icon pasted in the above method and are set in the format of the above merge work table such that the character strings are correlated with the corresponding item name (step S3).

A reference is sequentially made to the "item name information" of each piece of the "associated data information" inserted into the character symbol string of the name definition data to select the associated data character string correlated with the same "item name" from the associated data character strings read for the corresponding cell at step S3, and the associated data character string is changed by making a reference to the "conversion method information" in the corresponding "associated data information" to create an "associated data conversion character string" (step S4). The "associated data conversion character string" is the associated data character string read from the table and changed in accordance with a simple rule described later and is inserted into the target name character string instead of the associated data character string.

If an icon is pasted onto the file management table for the first time as in this case, since the code representing "non-conversion" is set as an initial value in the "conversion method information" in the "associated data information", the associated data character string read from the table is directly inserted as the "associated data conversion character string" into the target name character string.

The character/symbol string data of the name definition data are then used as a template and the "associated data information" thereof is replaced with the corresponding "associated data conversion character string" obtained at step S4 to acquire name text data representing the name of the file corresponding to the icon (step S5).

Figure 8:
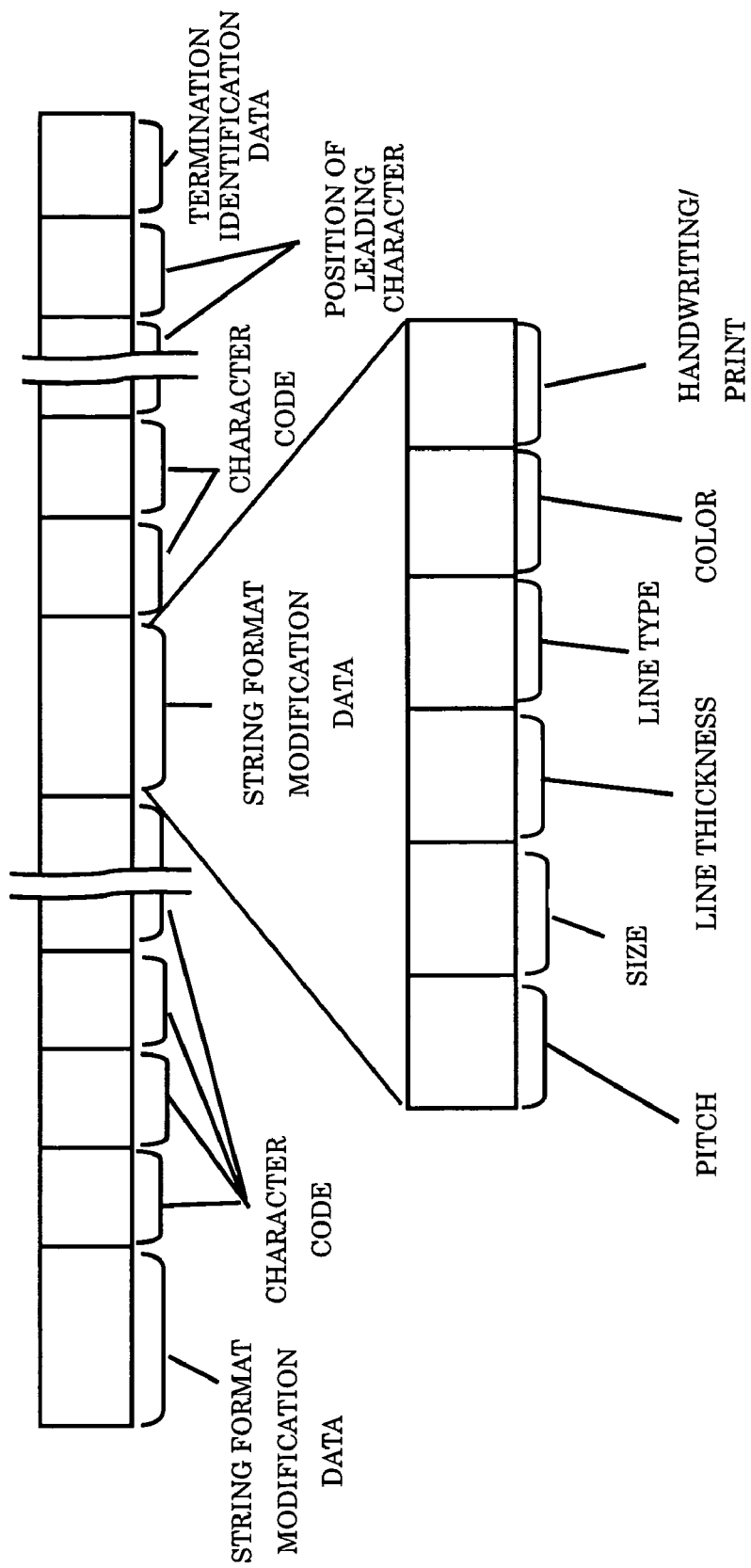
FIG. 8 depicts an example of a data format of character data in the system of the embodiment.
Figure 9:
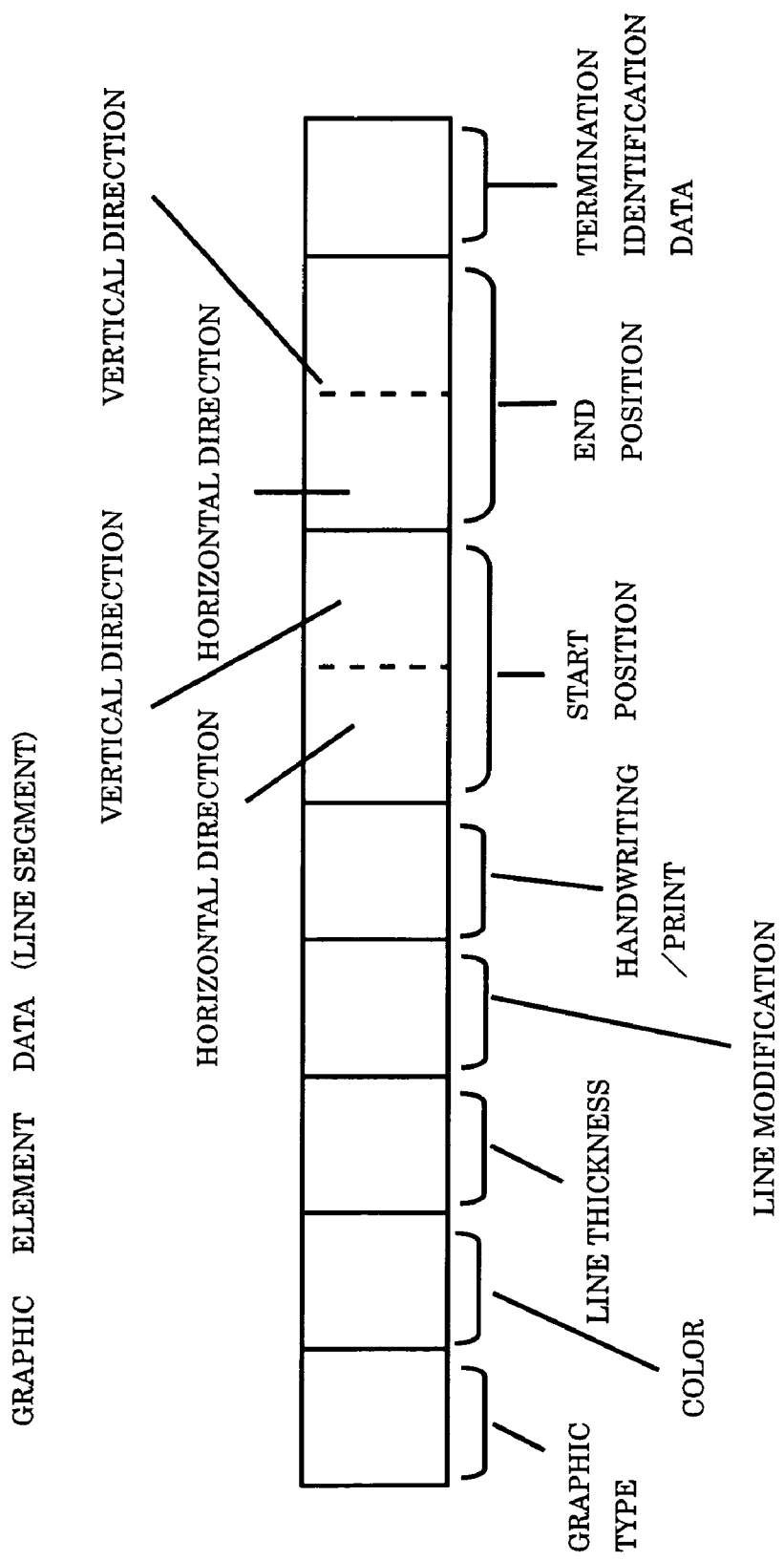
FIG. 9 depicts an example of a data format of ruled-line data in the system of the embodiment.

The name text data are created in a form of the character string shown in FIG. 8. The associated data conversion character string inserted as above or a portion of the associated data character string in the name text data is given, for example, predetermined certain grouping symbols (e.g., [ ]) such that the character string may be distinguished from adjacent portions. The grouping symbols for the associated data conversion character string or the associated data character string are added as the above "definition entry information" such that the character string may be distinguished from characters and symbols making up the name text data.

For example, when the name definition data are initially crated (step S2) in the table shown in FIG. 5, a character symbol string is created by linking the "associated data information" having the "item name information" of "BRANCH" and the "associated data information" having the "item name information" of "YEAR" with, for example, a symbol "-".

If a user pastes an icon of one CSV file into a cell with the associated data having "NAGOYA" for the item "BRANCH" and "YEAR 2002" for the item "YEAR", the system replaces the "associated data information" of the item name "BRANCH" and the "associated data information" of the item name "YEAR" with corresponding associated data character strings "NAGOYA" and "YEAR 2002", respectively, in the character/symbol string data of the name definition data to acquire the name character string text data "[NAGOYA]-[YEAR 2002]". The certain grouping symbols [ ] are added to "NAGOYA" and "YEAR 2002" to indicate the above associated data character string portions in the name character string text data.

The system then displays the name character string text data created as above on a suitable confirmation screen to change and determine the data in accordance with user's instructions from the confirmation screen (step S6).

Figure 27:
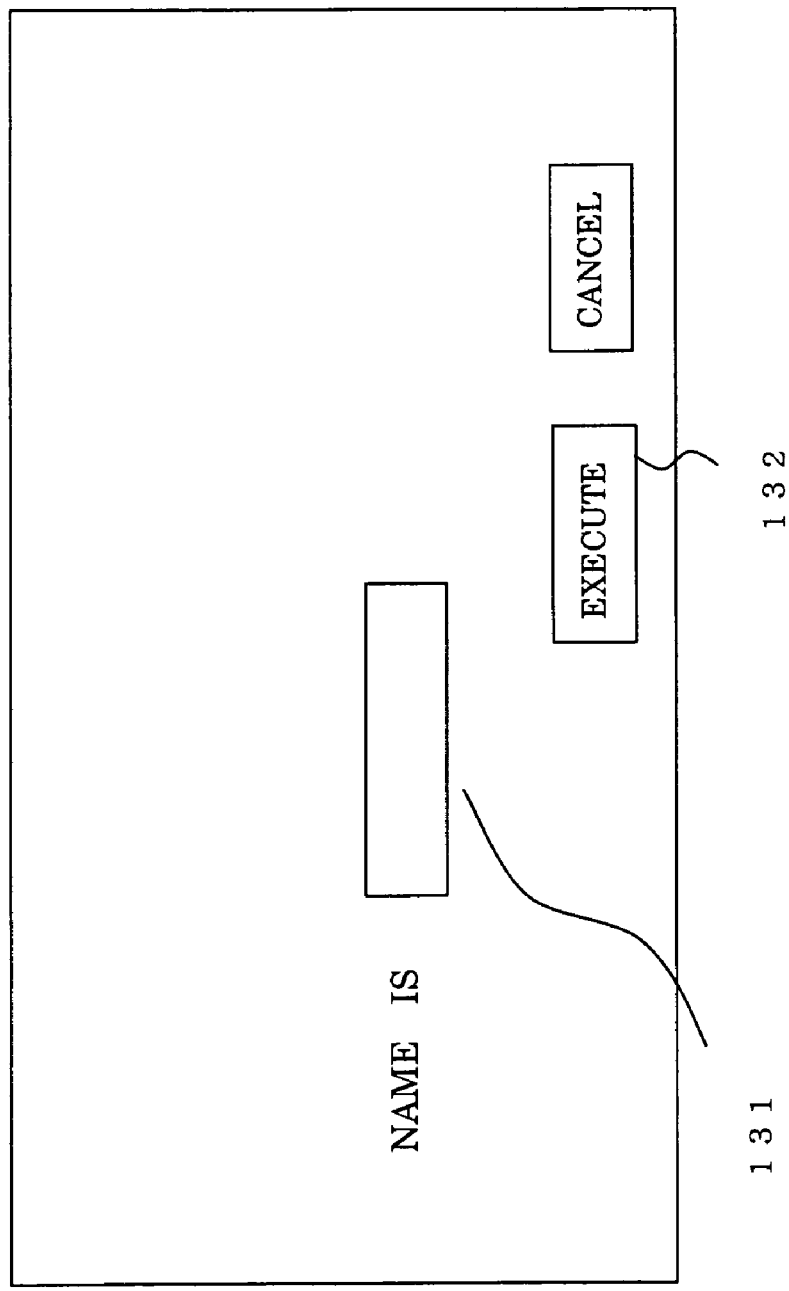
FIG. 27 depicts an example of a confirmation screen of a naming function for a file having an icon pasted in a table in the system of the embodiment.

For example, FIG. 27 shows the confirmation screen of this naming function, and the created name character string text data may be displayed in a name field 131 of the confirmation screen and changed to desired data of a user through a known character input function of the system. However, the changes in the name field 131 of the confirmation screen are performed such that the certain grouping symbols are added to the associated data conversion character string portion or the associated data character string portion even after the changes.

The changes in the created name character string by a user are performed only for changes complying with the rules defined in accordance with the agreement with a user for the associated data character strings read from the table in the associated data conversion character string portion or the associated data character string portion inserted into the name character string.

This conversion rule must enable a user to immediately identify the original associated data character strings from the changed character strings. For example, the conversion rule is extraction of a partial character string of a certain number of characters from the beginning of the text string, extraction of a partial character string of a certain number of characters from the end of the text string, extraction of a partial character string of a certain number of characters from the end of a numeric character string in the text string, or extraction of a partial character string of a certain number of characters from the beginning after conversion to Roman characters.

At the beginning of step S6, the name character string text data generated at step S5 are copied to another area in the system to generate second name character string text data, and the changes through the confirmation screen at step S6 are made in the second name character string text data.

The name character string is decided when a user specifies an "execution" button 132 on the confirmation screen, and the system exits step S6 and then determines whether a user makes a change at above step S6 (step S7). At step S7, the first name character string text data may be compared with the second name character string text data.

If it is determined at step S7 that the name character string text data are not changed, the name character string text data are registered (step S9) and this procedure is terminated. That is, the name data registered in the managing unit of the corresponding actual data file are updated with the generated name character string text data, and after adding a character string representing a corresponding type (e.g., ".csv"), the name information is updated in the file managing unit and the icon definition information of the corresponding data file. In the registration process at step S9, the name character string text data are set after removing the certain grouping symbols added to the associated data character string portions.

If it is determined at step S7 that a user makes the change at step S6, the system executes a process of updating the name definition data based on the changed name character string text data (step S8) and executes a registration process of step S9.

At step S8, based on the name character string text updated by the changes on the confirmation screen, the corresponding "associated data information" is created for the associated data conversion character string portions thereof, and the new name definition data are generated by replacing with the created "associated data information". The "associated data information" corresponding to the associated data conversion character string portions may be identified as follows.

The associated data conversion character string portions in the name character string text data may sequentially be identified as text portions having the certain grouping symbols added. For the associated data conversion character string portions, the original associated data character strings and a method of conversion from the original associated data character strings may be identified by checking the corresponding associated data conversion character string changed by a user against all the associated data character strings read from the table for the corresponding cell in accordance with a type of checking determined from the agreement with a user. For example, the checking such as whole matching, forward matching, and backward matching may be performed in a suitable order between both character strings.

The identification of the method of converting the associated data conversion character string is provided with a step of determining whether the associated data conversion character string changed by a user is a numeric character string, and if this determination is positive, the associated data character strings are checked by the backward matching. A step is also provided for determining whether the associated data conversion character string changed by a user is written in Roman characters, and if this determination is positive, the associated data character strings are converted into Roman characters with a known method to perform the various types of the checking.

The information indicating the method of conversion from the original associated data text identified as above is set in the "conversion method information" in the "associated data conversion information". An item name text correlated and set with the original associated data on the above merge work table is set in the "item name information" of the "associated data information".

For example, it is assumed that a user uses the character string input/edit function of the system for making changes such as adding "AGGREGATION-" to the beginning of the default created name "[NAGOYA]-[YEAR 2002]" of the system, interchanging the positions of the associated data character string portions, and deleting the numeric character string portion except the last two digits to create a new name "AGGREGATION-[02][NAGOYA]."

The system performs the above checking for the first associated data character string portion "02" in the changed name character string against the associated data character strings "NAGOYA" and "YEAR 2002" read from the table for the corresponding cell and detects that the character string portion matches with the last two digits of the numeric character string portion of the associated data character string "YEAR 2002" to identify the method of changing from the original associated data character string as "backward matching of the last two digits of the numeric character string portion".

The item name to be set in the "item name information" in the "associated data information" is "YEAR" that is the item name of the original associated data character string "YEAR 2002" identified by the above checking and is correlated and set with the corresponding associated data character string "YEAR 2002" on the above merge work table.

As a result, for the "associated data information" corresponding to the associated data conversion character string portion "02", the "associated data information" is created with the text string "YEAR" set in the "item name information" thereof, a corresponding code indicating the "backward matching of the last two digits of the numeric character string portion" set in a "category" portion in the "conversion method information", and "2" set in a "matched character count" portion in the "conversion method information".

For another associated data conversion character string portion "NAGOYA", the "associated data information" is created in the same way with the text string "BRANCH" set in the "item name information" thereof and a corresponding code indicating the "non-conversion" set in the "category" portion in the "conversion method information". The new name definition data may be acquired based on the name character string text "AGGREGATION-[02][NAGOYA]" updated by the changes on the confirmation screen by replacing the associated data conversion character string portions "02" and "NAGOYA" thereof with the "associated data information" created as above.

Once the name definition data are update as above, the name text data are generated based on the updated latest name definition data for files of icons subsequently passed on the table. That is, since the name definition data are generated at the determination at step S1, the "initial generation of name definition data" at step S2 is skipped to read the associated data of the corresponding cell (step S3), and the "associated data conversion character string" is acquired by reference to the "conversion method information" in the "associated data information" as above (step S4).

The character/symbol string data of the currently changed name definition data are then used as a template and the "associated data information" thereof is replaced with the corresponding "associated data conversion character string" to acquire name text data (not shown) representing the name of the file corresponding to the icon (step S5).

For example, for a cell adjacent to the right side of the cell referenced in the above description (a cell on the third line from the top and the fourth column from the left on the table), the associated data character strings are read from the table as "YEAR 2003" for the item name "YEAR" and "NAGOYA" for the item name "BRANCH".

Since the "YEAR" is set in the "item name text information" and the corresponding information indicating the "backward matching of the last two digits of the numeric character string portion" is set in the "associated data conversion information as above for the current "associated data information" set in the character/symbol string data of the current name definition data, an associated data character string "YEAR 2003" of the item name "YEAR" is selected from the associated data character strings read from the table and the last two digits of the numeric character string portion is cut out to acquire an associated data conversion character string "03", which replaces the corresponding "associated data information" in the character/symbol string data of the name definition data.

Since the text string "BRANCH" is set in the "item name text information" of the "associated data information" set in the next position of the character/symbol string data of the name definition data and the corresponding code indicating "non-conversion" is set in the "category" portion of the "conversion method information", the corresponding "associated data information" is replaced with "NAGOYA" of the associated data character strings read from the table.

The name text data generated here are decided at step S6 and registered as the target name character string (step S9). If the name text data are changed again at step S6, the name definition data are newly updated (step S8).

The naming target of the icon pasted on the file management table is not limited to a data file in this naming function and may be a file of another type, for example, a document file, and different types of files may be included in a series of file quote fields. The naming target may be a folder that is a group of a plurality of files.

The defining of the item definition for the file quote field may be omitted in the naming function on the file management table as is the case with the merging function of the associated data in accordance with the pasting of the corresponding icons on the corresponding table.

That is, with regard to data within the same table as the cell with the icon dragged and dropped, located on the upper side or left side of the cell, and having the item name defined, when it is assumed in an agreement with a user that the data must be the associated data of the corresponding cell, if the system detects that the icon is dragged and dropped in the tabulation process application screen 33, the system first determines whether the dragged and dropped position is within the cell having the cell data created and whether the associated data satisfying the above arrangement condition are detected from the same table as above. If this determination is positive, the above naming process may be executed for the corresponding data file based on the identified associated data. Since the item definition data are not generated for the file quote field in this case, the name definition data are set at a certain position determined in the system.

The associated data having the same item name are arranged in one line on the upper side of the file quote field or in one column on the left side of the file quote field. Therefore, one line on the upper side of the file quote field or one column on the left side of the file quote field may be defined by the agreement with a user to be handled in the same way as the data field with one piece of item definition data generated, and the name character strings may be generated on the table without the item names of the associated data character strings and the definition of data field ranges.

For example, when an icon representing a certain file is pasted on a cell in the file quote field (without the item names of the associated data character strings and the definition of data field ranges) on the file management table shown in FIG. 5, the system makes a response by determining whether the cell data are generated for the corresponding table, and if the cell data are not generated, the system generates and stores the cell data into a certain area in the file management table application information and places a cell data generation flag on a certain area in the system. A reference may be made to this specific flag when determining whether the cell data are generated.

The procedure of FIG. 25 is then performed in the same way as the above case. However, the name definition data is generated such that "line/column specification information" defining the corresponding line or column with the associated data character string entered is set instead of the "item name information" in the "associated data information" and are stored in a certain area of the file management table application information at step S2 in this case.

Figure 28:
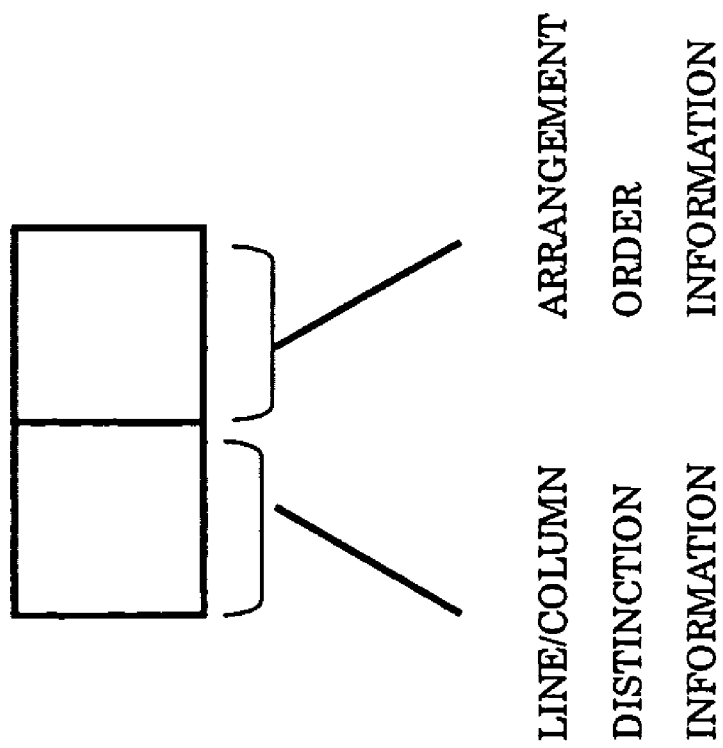
FIG. 28 depicts an example of a data format of line/column specification information data in the system of the embodiment.

For example, the above line/column specification information consists of "line/column distinction information" indicating a distinction between a line and a column and "arrangement order information" indicating the arrangement order in the table as shown in FIG. 28. This arrangement order means a line position counted from the top of the table or a column position counted from the left of the table.

At step S2, if entry data may be read on the upper side or the left side of the cell with an icon pasted in the table, the corresponding "associated data information" is generated and information indicating the line or column having the corresponding entry data is set in the "line/column specification information". If the entry data are read on the upper side of the table, the information indicating the "line" is set in the "line/column specification information" and the "line/column distinction information", and information indicating a line position is set in the "arrangement order information". If the entry data are read on the left side of the table, the information indicating the "column" is set in the "line/column specification information" and the "line/column distinction information", and information indicating a column position is set in the "arrangement order information". The created "associated data information" is inserted into the name definition data in random order as above.

At step S3, the system reads the associated data character strings of the icon-pasted cell such that the corresponding "line/column specification information" is correlated. The associated data character strings are correlated with the "line/column specification information" indicating the "line" thereof if the associated data character strings are located on the upper side of the file quote field or indicating the "column" thereof if the associated data character strings are located on the left side of the file quote field when being read.

For example, the associated data "YEAR 2002" read from the first line of the table for the corresponding file quote field cell on the table are correlated with the "line/column specification information" having a corresponding code indicating the "line" set in the "line/column distinction information" and "1" set in the "arrangement order information" when being read. A fifth line may be added to the merge work table to set the line/column specification information read and correlated with the associated data character strings into the corresponding column of the fifth line of the merge work table.

At step S4, a reference is made to the "line/column specification information" of each piece of the "associated data information" inserted into the character symbol string of the name definition data to select the associated data character string correlated with the same "line/column specification information" from the associated data character strings read for the corresponding icon-pasted cell from the table, and the associated data character string is changed with the "conversion method information" in the corresponding "associated data information" to create an "associated data conversion character string".

At step S5, each piece of the "associated data information" in the character symbol string of the name definition data may be replaced with the corresponding "associated data conversion character string" created as above. Each "associated data conversion character string" portion in the name character string changed at step S6 is replaced with the "line/column specification information" corresponding to the original associated data character string and the corresponding "conversion method" after identifying the original associated data character string and the conversion method as above at step S8 to update the name definition data.

When information is identified from entry information such as character strings entered in association with the corresponding icons on documents and is added to data making up a data file, the information may be data attribute information such as a name of a unit of data or effective numbers. For example, it is assumed that a comment of "unit of sales is K \" is entered at the right shoulder portion outside of the file management table of FIG. 5 to indicate a unit of data of the item "sales amount". This system takes the following action to convert this comment into definition information used such that the contents represented by the comment for a user are directly specified for the system.

First, an item name "UNIT" and synonyms thereof for indicating unit information of data is registered into the applied term dictionary 52. A code indicating the "item name" is set in the "item name category" field in the dictionary as shown in FIG. 12. Terms representing units (\, $, Kg, etc.) are registered in the system in accordance with a format shown in FIG. 30 to make up the applied term dictionary 52 along with the registered words in the format shown in FIG. 12. The terms representing units are classified by categories (e.g., amount of money, weight, and area), and terms having the same meaning and conversion coefficients are arranged in one line in the format shown in FIG. 30.

The above "item name" specification is performed for the data item name in the comment; the above "registered word" specification is performed for the item name of the unit; and the above "registered word" specification or the above "data name" specification is performed for the term representing the unit on the screen. The above specifications of "item name", "registered word", and "data name" may be performed by using the sub-screen 90 to specify the corresponding menu item buttons as in the above case. In the case of this example, the "item name" specification is performed for the character string "sales" in the comment; the "registered word" specification is performed for the character string "unit"; and the "data name" specification is performed for the character string "K \" as shown in FIG. 29B.

If a character string "Kou" specified to the "item name", a term "Otsu" representing the "item of unit" specified to the "registered word", and a term "Hei" representing the unit name specified to the "registered word" are entered an arranged in one line in a certain order, the system reads that "a unit of data of the item name 'Kou' is 'Hei'" in accordance with an agreement with a user. The above certain order is an arrangement order in description of the natural language used by a user and is, for example, the order of "Kou", "Otsu", and "Hei" in the case of Japanese.

Data files represented by all the icons pasted on the same document (same page) as the defining comment are read for the target data files defined with the data attribute information in accordance with an agreement with a user. If it is desirable to correlate the defining comment with only a certain icon, the above "linking line" may be used to correlate both.

If a plurality of types of data attributes is desired to be defined, the following method is available. First, a term used as the "item name" in the description of the data attribute as a pair of "item name" and "data" is registered in the "data attribute item name specification" segment in the applied term dictionary 52, and the item definition may be performed on the table representing data attributes as shown in FIG. 29C. The item definition in this case may also be performed in completely the same way as the above item definition on the file management table.

In the item definition shown in FIG. 29C, the "data" 'SALES AMOUNT', 'UNIT PRICE', etc., are defined for the "item name" 'ITEM NAME' entered in the first line, and the "data" 'K \', '\ ', etc., are similarly defined for the "item name" 'UNIT' entered in the first line. The data in the same line on the table, for example, 'SALES AMOUNT' and 'K \' as well as 'UNIT PRICE' and '\' are read as one record that forms one piece of the data attribute description information.

Figure 31:
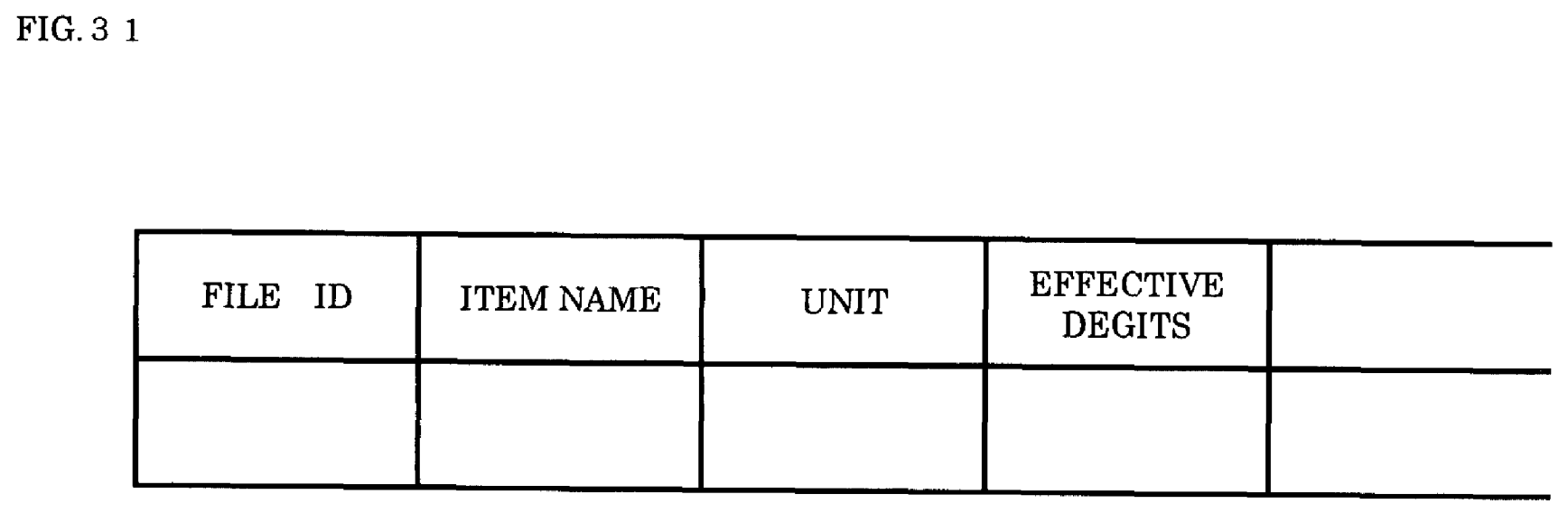

In the case of the above example, the "unit of sales is K \" is defined for all the data files having icons pasted on the file management table. Other pieces of the data attribute information, for example, effective digits of numeric values may similarly be defined. The identified data attribute information is stored in a predetermined area of the definition data storage unit 54 allocated to eth corresponding "tabulation process application" file information, for example, in a form of data attribute definition data with a configuration shown in FIG. 31 using the corresponding data file and the corresponding item name as keys.

When the file management table having icons of data files pasted is specified as a data output source, constituent records are fetched from the data files as above; a reference is made to the data attribute definition data registered for the corresponding data file; and the acquired attribute is added to and output with the corresponding data in accordance with a specified predetermined output format.

With regard to the data output format, for example, the fifth or later lines may be added to the format of the merge work table shown in FIG. 22; the items of data attributes may be allocated to the respective lines such as a "unit" entry field in the fifth line and an "effective digits" entry field in the sixth line; and the codes representing corresponding attribute values may be set in the fields of the corresponding items and the corresponding attributes.

Various examples are known about defining a unit of data entered in a field serving as a data entry area on a document, performing conversion based on unit information defined for input source data, and outputting a converted numeric value as a character string in a corresponding field.

If the "sales amount" data acquired from the above file management table are output to a field having a unit defined as "ten thousand yen" on another document, conversion is performed for a numeric value of the "sales amount" data of the input source with a conversion rate defined between "K \" and "ten thousand yen", and the acquired converted numeric value is entered. In this case, the conversion rate between "K \" and "ten thousand yen" may be acquired from both pieces of conversion rate information "1" and "10000" defined for "K \" and "ten thousand yen", respectively, which are terms representing units in the applied term dictionary 52 in this system.

The present invention uses a program or software for implementing the above functions of the present invention. This software may be installed into the system of the present invention through an arbitrary medium, for example, an accumulation medium or online. Therefore, embodiments of the present invention include an act of delivering an accumulation medium having stored thereon software for implementing the present invention for business purposes and an act of installing the software into the system online.

The invention claimed is:

1. A method performed by an information processing apparatus,
wherein the information processing apparatus includes:
a display screen;
a means for representing file information by a corresponding icon that corresponds to the file information, such that the corresponding icon is an image specified for each type of file information displayed on the display screen of the information processing apparatus, and such that, according to a specified designation of the corresponding icon, the file information represented by the corresponding icon is stored in a memorizing means of the information processing apparatus, while content of the file information represented by the corresponding icon is displayed on the display screen of the information processing apparatus;
a means for generating and storing table format data representing a table, such that the table is divided into rows and columns and the table is provided with a file quote field and a plurality of index word entry fields, such that the corresponding icon that corresponds to the file information is disposed in the file quote field of the table, such that each index word entry field of the plurality of index word entry fields of the table is located in a row or a column not occupied by the file quote field of the table, and such that each index word entry field of the plurality of index word entry fields includes a corresponding index word, of a plurality of index words entered therein;

a means for defining a corresponding item name, of a plurality of item names, for each index word entry field of the plurality of index word entry fields;

a means for displaying, on the display screen, the table based on the table format data; and a means for storing data files, and wherein the method comprises:

disposing the corresponding icon at a position located inside of the file quote field of the table;

identifying, from among the plurality of index words entered for each of the plurality of index word entry fields and for each of the plurality of index word entry fields, an index word with a corresponding item name of the plurality of item names, the identified index word being located in the row or in the column of the table in which the corresponding icon is disposed, and the identified index word being identified by comparing the position of the disposed corresponding icon with a position of each index word of the plurality of index words, in response to the disposing of the corresponding icon at the position located inside of the file quote field of the table; and adding each respective index word identified, by the identifying, for each of the plurality of index word entry fields as a new constituent datum to each record of a plurality of records fetched from a data file of the stored data files, so as to generate a new record, such that each respective index word added as the new constituent datum is associated with the corresponding item name of the plurality of item names, and such that each record of the plurality of records is a set of data, wherein each datum of the set of data is associated with a corresponding item name of the plurality of item names.

2. A method performed by an information processing apparatus, wherein the information processing apparatus includes:

a display screen;

a means for representing file information by a corresponding icon that corresponds to the file information, such that the corresponding icon is an image specified for each type of file information displayed on the display screen of the information processing apparatus, and such that, according to a specified designation of the corresponding icon, the file information represented by the corresponding icon is stored in a memorizing means of the information processing apparatus, while content of the file information represented by the corresponding icon is displayed on the display screen of the information processing apparatus;

a means for generating and storing table format data representing a table, such that the table is divided into rows and columns and the table is provided with a file quote field and a plurality of index word entry fields, such that the corresponding icon that corresponds to the file information is disposed in the file quote field of the table, such that each index word entry field of the plurality of index word entry fields of the table is located in a row or a column not occupied by the file quote field of the table, and such that each index word entry field of the plurality of index word entry fields includes a corresponding index word, of a plurality of index words entered therein; and a means for displaying, on the display screen, the table based on the table format data, and wherein the method comprises:

disposing the corresponding icon at a position located inside of the file quote field of the table;

identifying, from among the plurality of index words entered for each of the plurality of index word entry fields and for each of the plurality of index word entry fields, an index word, the identified index word being located in the row or in the column of the table in which the corresponding icon is disposed, and the identified index word being identified by comparing the position of the disposed corresponding icon with a position of each index word of the plurality of index words, in response to the disposing of the corresponding icon at the position located inside of the file quote field of the table;

combining character strings, each character string of the combined character strings respectively representing a respective index word, of the plurality of index words, identified by the identifying, in a corresponding index word entry field of the plurality of index word entry fields, the combined character strings being combined according to an order defined by a predetermined method so as to generate a new single character string; and defining the generated new single character string as a name of the file information represented by the corresponding icon, the name of the file information being specified for the file information as a property of the file information.

3. The method of claim 2, wherein the information processing apparatus further includes a means for defining a corresponding item name, of a plurality of item names, for each index word entry field of the plurality of index word entry fields, such that the order of the combining of the character strings is performed by ordering each corresponding item name of the plurality of item names using a means provided for ordering each of the corresponding item names.

4. The method of claim 3, wherein each character string of the combined character strings is generated respectively by converting the respective character string of the identified index word using a means provided for a determination of a conversion method.

5. The method of claim 4, further comprising:

displaying, on the means provided for the determination of the conversion method, an index word, from among the plurality of index words, for each item name of the plurality of item names, the displayed index word being selected according to a predetermined method and being selected from among index words identified with the corresponding item name of the plurality of item names;

altering, on the means provided for the determination of the conversion method, the character string of the displayed index word so as to generate a first character string;

comparing the first character string with a second character string, the second character string being generated by converting a character string assigned before the altering to the displayed index word according to each of a plurality of candidate conversion methods; and defining, as the conversion method used for the name specifying the file information, a candidate conversion method, wherein the second character string obtained by the defined candidate conversion method is equal to the first character string.

6. The method of claim 5, wherein each index word of the plurality of index words displayed on the means for the determination of the conversion method is an index word in the corresponding index word entry field based on a specified relation to a position designated by a user on the means for displaying the table.

7. An information processing apparatus, comprising:
a display screen;
a means for representing file information by a corresponding icon that corresponds to the file information, such that the corresponding icon is an image specified for each type of file information displayed on the display screen of the information processing apparatus, and such that, according to a specified designation of the corresponding icon, the file information represented by the corresponding icon is stored in a memorizing means of the information processing apparatus, while content of the file information represented by the corresponding icon is displayed on the display screen of the information processing apparatus;
a means for generating and storing table format data representing a table, such that the table is divided into rows and columns and the table is provided with a file quote field and a plurality of index word entry fields, such that the corresponding icon that corresponds to the file information is disposed in the file quote field of the table, such that each index word entry field of the plurality of index word entry fields of the table is located in a row or a column not occupied by the file quote field of the table, and such that each index word entry field of the plurality of index word entry fields includes a corresponding index word, of a plurality of index words for disposed icons entered therein;
a means for defining a corresponding item name, of a plurality of item names, for each index word entry field of the plurality of index word entry fields;
a means for displaying, on the display screen, the table based on the table format data;
a means for storing data files;
a means for disposing the corresponding icon at a position located inside of the file quote field of the table using the means for displaying the table;
a means for identifying, from among the plurality of index words entered for each of the plurality of index word entry fields and for each of the plurality of index word entry fields, an index word with a corresponding item name of the plurality of item names, the identified index word being located in the row or in the column of the table in which the corresponding icon is disposed, and the identified index word being identified by comparing the position of the disposed corresponding icon with a position of each index word of the plurality of index words, in response to the disposing of the corresponding icon at the position located inside of the file quote field of the table; and
a means for adding each respective index word identified, by the means for identifying, for each index word entry field of the plurality of index word entry fields as a new constituent datum to each record of a plurality of records fetched from a data file of the stored data files, so as to generate a new record, such that each respective index word added as the new constituent datum is associated with the corresponding item name of the plurality of item names, and such that each record of the plurality of records is a set of data, wherein each datum of the set of data is associated with a corresponding item name of the plurality of item names.

8. An information processing apparatus comprising:
a display screen;
a means for representing file information by a corresponding icon that corresponds to the file information, such that the corresponding icon is an image specified for each type of file information displayed on the display screen of the information processing apparatus, and such that, according to a specified designation of the corresponding icon, the file information represented by the corresponding icon is stored in a memorizing means of the information processing apparatus, while content of the file information represented by the corresponding icon is displayed on the display screen of the information processing apparatus;
a means for generating and storing table format data representing a table, such that the table is divided into rows and columns and the table is provided with a file quote field and a plurality of index word entry fields, such that the corresponding icon that corresponds to the file information is disposed in the file quote field of the table, such that each index word entry field of the plurality of index word entry fields of the table is located in a row or a column not occupied by the file quote field of the table, and such that each index word entry field of the plurality of index word entry fields includes a corresponding index word, of a plurality of index words entered therein;
a means for displaying, on the display screen, the table based on the table format data
a means for disposing the corresponding icon at a position located inside of the file quote field of the table using the means for display the table;
a means for identifying, from among the plurality of index words entered for each of the plurality of index word entry field and for each of the plurality of index word entry fields, an index word, the identified index word being located in the row or in the column of the table in which the corresponding icon is disposed, and the identified index word being identified by comparing the position of the disposed corresponding icon with a position of each index word of the plurality of index words, in response to the disposing of the corresponding icon at the position located inside of the file quote field of the table;
a means for combining character strings, each character string of the combined character strings respectively representing a respective index word, of the plurality of index words, identified by the means for identifying, in a corresponding index word entry field of the plurality of index word entry fields, the combined character strings being combined according to an order defined by a predetermined method so as to generate a new single character string; and
a means for defining the generated new single character string as a name of the file information represented by the corresponding icon, the name of the file information being specified for the file information as a property of the file information.

9. A non-transitory computer-readable recording medium having a computer program recorded thereon, the program for controlling an information processing apparatus,
wherein the information processing apparatus includes:
a display screen;
a means for representing file information by a corresponding icon that corresponds to the file information, such that the corresponding icon is an image specified for each type of file information displayed on the display screen of the information processing apparatus, and such that, according to a specified designation of the corresponding icon, the file information represented by the corresponding icon is stored in a memorizing means of the information processing apparatus, while content of the file information represented by the corresponding icon is displayed on the display screen of the information processing apparatus;

a means for generating and storing table format data representing a table, such that the table is divided into rows and columns and the table is provided with a file quote field and a plurality of index word entry fields, such that the corresponding icon that corresponds to the file information is disposed in the file quote field of the table, such that each index word entry field of the plurality of index word entry fields of the table is located in a row or a column not occupied by the file quote field of the table, and such that each index word entry field of the plurality of index word entry fields includes a corresponding index word, of a plurality of index words entered therein;

a means for defining a corresponding item name, of a plurality of item names, for each index word entry field of the plurality of index word entry fields;

a means for displaying, on the display screen, the table based on the table format data; and a means for storing data files, and wherein the method comprises:

disposing the corresponding icon at a position located inside of the file quote field of the table;

identifying, from among the plurality of index words entered for each of the plurality of index word entry fields and for each of the plurality of index word entry fields, an index word with a corresponding item name of the plurality of item names, the identified index word being located in the row or in the column of the table in which the corresponding icon is disposed, and the identified index word being identified by comparing the position of the disposed corresponding icon with a position of each index word of the plurality of index words, in response to the disposing of the corresponding icon at the position located inside of the file quote field of the table; and adding each respective index word identified, by the identifying, for each of the plurality of index word entry fields as a new constituent datum to each record of a plurality of records fetched from a data file of the stored data files, so as to generate a new record, such that each respective index word added as the new constituent datum is associated with the corresponding item name of the plurality of item names, and such that each record of the plurality of records is a set of data, wherein each datum of the set of data is associated with a corresponding item name of the plurality of item names.

10. A non-transitory computer-readable recording medium having a computer program recorded thereon, the program for controlling an information processing apparatus, wherein the information processing apparatus includes:

a display screen;

a means for representing file information by a corresponding icon that corresponds to the file information, such that the corresponding icon is an image specified for each type of file information displayed on the display screen of the information processing apparatus, and such that, according to a specified designation of the corresponding icon, the file information represented by the corresponding icon is stored in a memorizing means of the information processing apparatus, while content of the file information represented by the corresponding icon is displayed on the display screen of the information processing apparatus;

a means for generating and storing table format data representing a table, such that the table is divided into rows and columns and the table is provided with a file quote field and a plurality of index word entry fields, such that the corresponding icon that corresponds to the file information is disposed in the file quote field of the table, such that each index word entry field of the plurality of index word entry fields of the table is located in a row or a column not occupied by the file quote field of the table, and such that each index word entry field of the plurality of index word entry fields includes a corresponding index word, of a plurality of index words entered therein; and a means for displaying, on the display screen, the table based on the table format data, and wherein the method comprises:

disposing the corresponding icon at a position located inside of the file quote field of the table;

identifying, from among the plurality of index words entered for each of the plurality of index word entry fields and for each of the plurality of index word entry fields, an index word, the identified index word being located in the row or in the column of the table in which the corresponding icon is disposed, and the identified index word being identified by comparing the position of the disposed corresponding icon with a position of each index word of the plurality of index words, in response to the disposing of the corresponding icon at the position located inside of the file quote field of the table;

combining character strings, each character string of the combined character strings respectively representing a respective index word, of the plurality of index words, identified by the identifying, in a corresponding index word entry field of the plurality of index word entry fields, the combined character strings being combined according to an order defined by a predetermined method so as to generate a new single character string; and defining the generated new single character string as a name of the file information represented by the corresponding icon, the name of the file information being specified for the file information as a property of the file information.

11. The method of claim 2, wherein an input character string input by a first determined method is added, by a second determined method, to the combined character strings combined by the combining of the character strings, such that the combined character strings include the input character string, such that each respective character string of the combined character strings, excluding the input character string, is generated by a respectively determined rule based on a respective index word of the plurality of index words, and such that the combined character strings including the input character string are newly defined as the name of the file information.

12. The information processing apparatus of claim 8, wherein an input character string input by a first determined method is added, by a second determined method, to the combined character strings combined by the means for combining the character strings, such that the combined character strings include the input character string, such that each respective character string of the combined character strings, excluding the input character string, is generated by a respectively determined rule based on a respective index word of the plurality of index words, and such that the combined character strings including the input character string are newly defined as the name of the file information.

13. The non-transitory computer-readable recording medium claim 10, wherein an input character string input by a first determined method is added, by a second determined method, to the combined character strings combined by the combining of the character strings, such that the combined character strings include the input character string, such that each respective character string of the combined character strings, excluding the input character string, is generated by a respectively determined rule based on a respective index word of the plurality of index words, and such that the combined character strings including the input character string are newly defined as the name of the file information.

* * * * *